(12) United States Patent
Kadowaki et al.

(10) Patent No.: US 12,541,263 B2
(45) Date of Patent: Feb. 3, 2026

(54) SENSOR, SENSOR CONTROLLER, AND POSITION DETECTION DEVICE

(71) Applicant: Wacom Co., Ltd., Saitama (JP)

(72) Inventors: Jun Kadowaki, Saitama (JP); Ryutaro Nitobe, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/041,723

(22) Filed: Jan. 30, 2025

(65) Prior Publication Data
US 2025/0251819 A1 Aug. 7, 2025

(30) Foreign Application Priority Data
Feb. 1, 2024 (JP) .................................. 2024-014006

(51) Int. Cl.
*G06F 3/041* (2006.01)
*G01D 5/24* (2006.01)
*G06F 3/044* (2006.01)

(52) U.S. Cl.
CPC ........... *G06F 3/04164* (2019.05); *G01D 5/24* (2013.01); *G06F 3/0446* (2019.05); *G06F 2203/04112* (2013.01)

(58) Field of Classification Search
None
See application file for complete search history.

(56) References Cited

U.S. PATENT DOCUMENTS

| | | | | |
|---|---|---|---|---|
| 7,453,542 B2 * | 11/2008 | Muramatsu | ........... | G02F 1/1345 349/149 |
| 2008/0252608 A1 * | 10/2008 | Geaghan | ............... | G06F 3/0446 345/173 |
| 2011/0048812 A1 * | 3/2011 | Yilmaz | ............... | G06F 3/04164 178/18.06 |
| 2014/0210784 A1 * | 7/2014 | Gourevitch | ........... | G06F 3/0443 345/174 |
| 2017/0031514 A1 * | 2/2017 | Kimura | ............... | G02F 1/13338 |
| 2021/0200407 A1 * | 7/2021 | Jang | .................... | G06F 3/04164 |

FOREIGN PATENT DOCUMENTS

| | | |
|---|---|---|
| JP | 2021149161 A | 9/2021 |
| WO | WO 2019069696 A1 | 4/2019 |
| WO | WO 2019235322 A1 | 12/2019 |

* cited by examiner

*Primary Examiner* — Krishna P Neupane
(74) *Attorney, Agent, or Firm* — Seed Intellectual Property Law Group LLP

(57) ABSTRACT

Provided is a sensor including sensor electrodes disposed from a first end to a second end in a first direction in a touch surface, terminals that are each disposed for a corresponding one of sets of sensor electrodes among the sensor electrodes and connected to a sensor controller, and routing lines that connect each of the sensor electrodes to one of the terminals corresponding to one of the sensor electrodes. An interconnect resistance per unit length of each of the sensor electrodes becomes lower continuously or in a stepwise manner, according to an interconnect distance from a portion connecting with one of the routing lines corresponding to one of the sensor electrodes, and a difference in the interconnect resistances between any two sensor electrodes among the sensor electrodes is smaller than a case in which an interconnect resistance per unit length in each of the routing lines is constant.

12 Claims, 17 Drawing Sheets

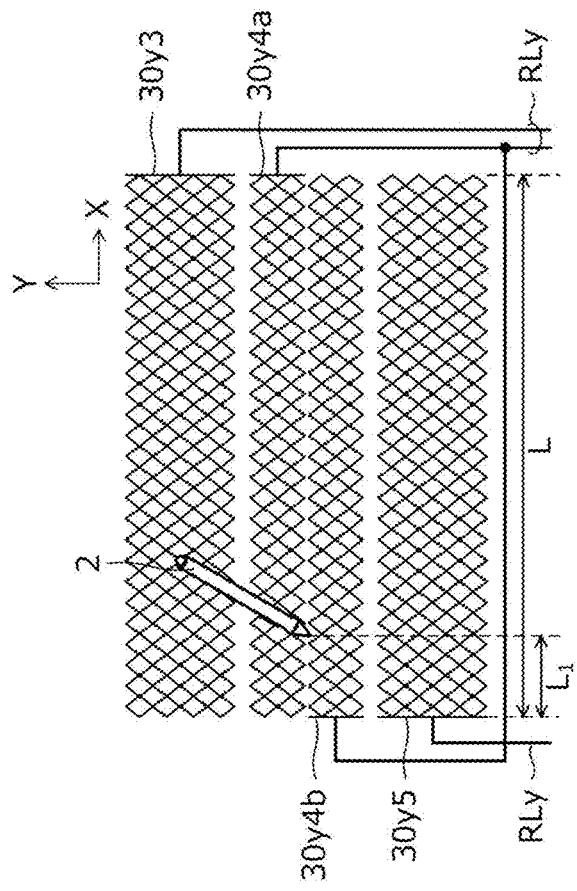
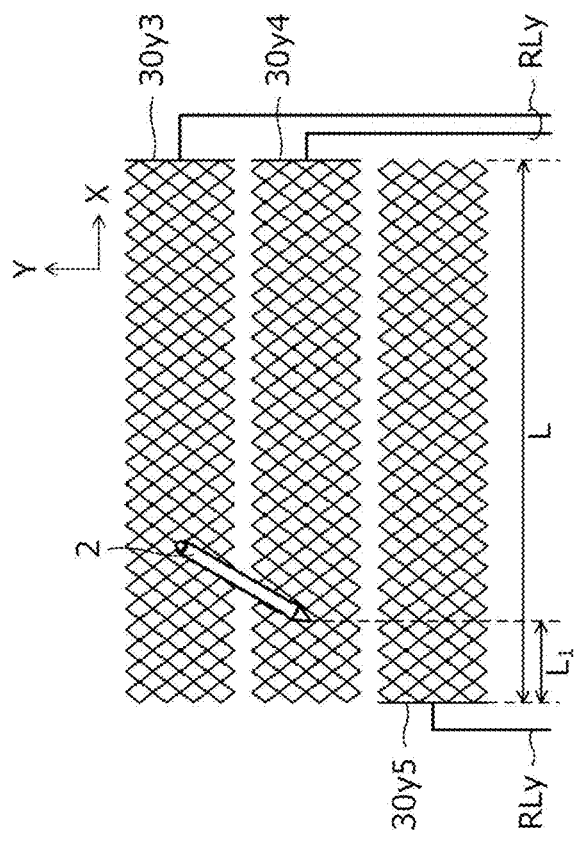

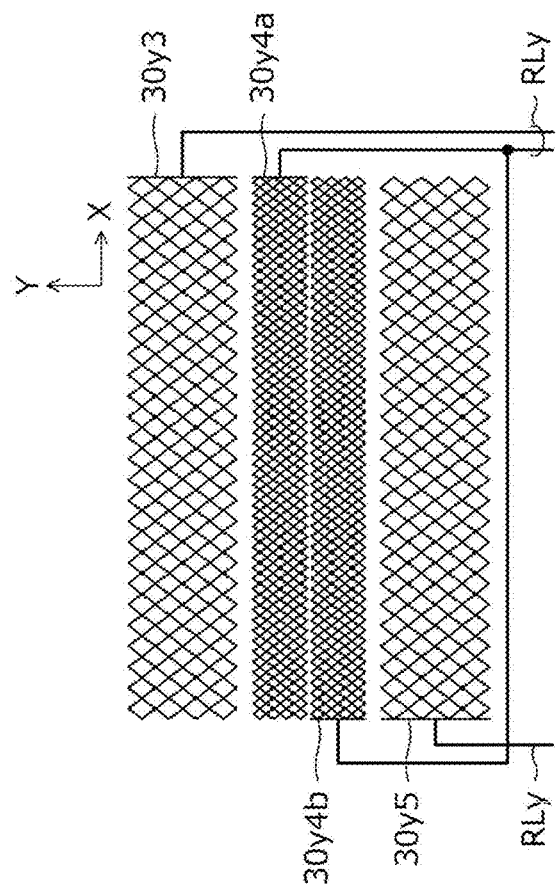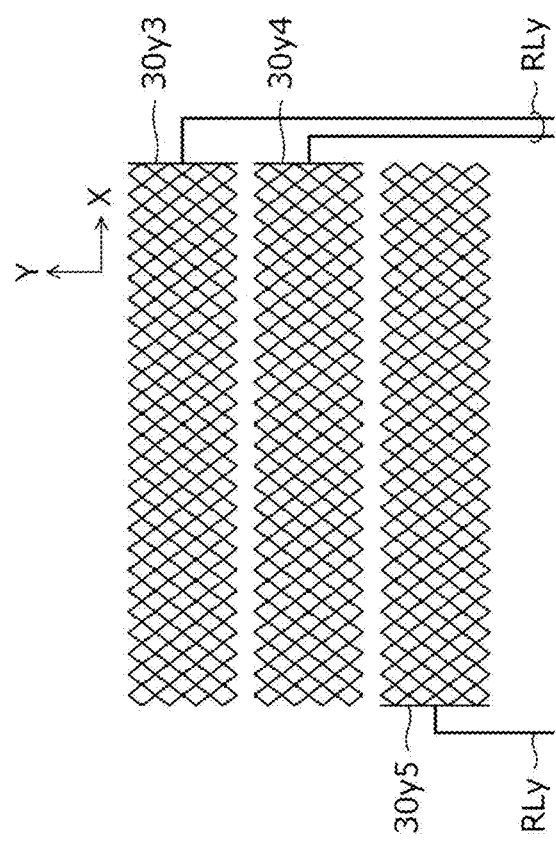
FIG. 12B
FIG. 12A

F I G . 13
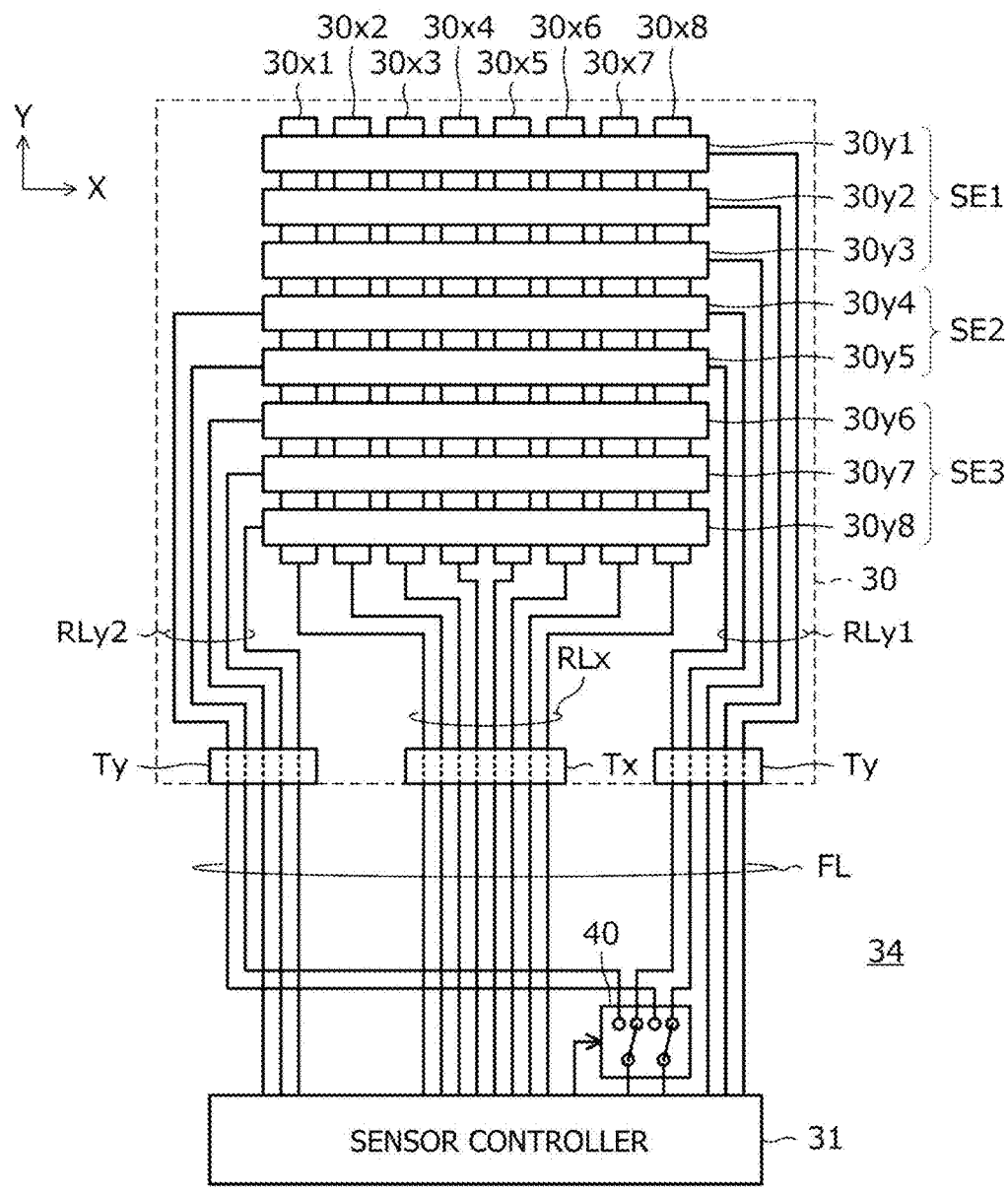

FIG.14A
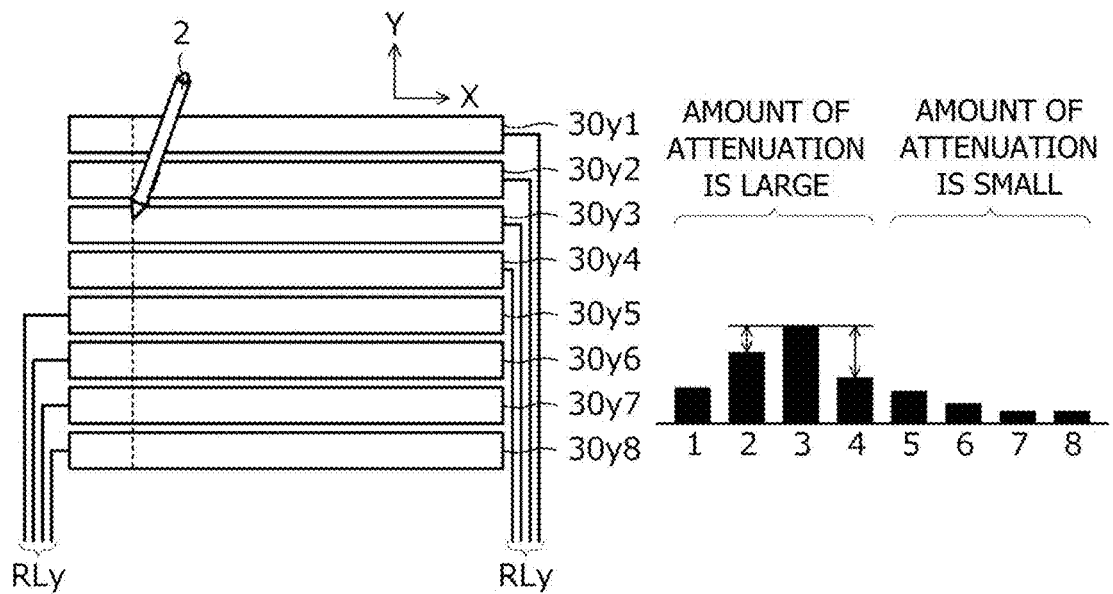
FIG.14B
FIG.14C
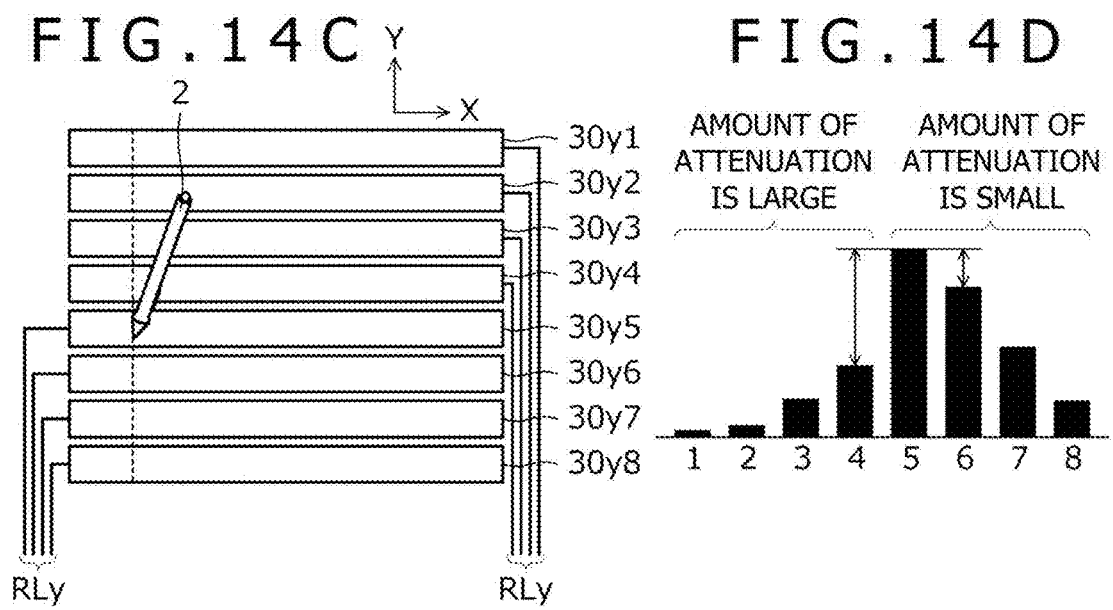
FIG.14D

FIG.15A
FIG.15B
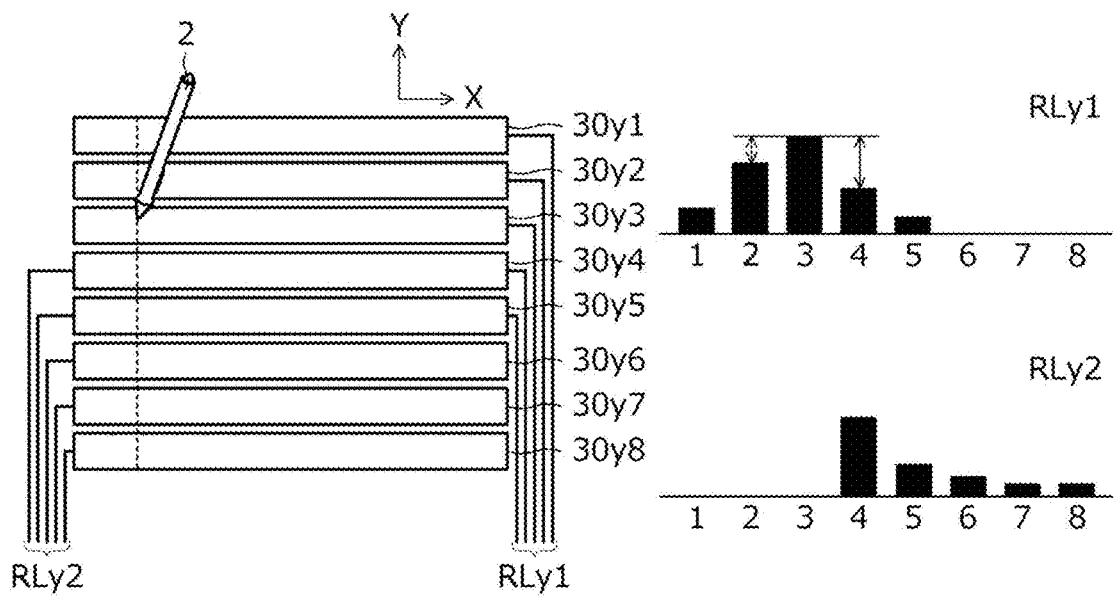
FIG.15C
FIG.15D
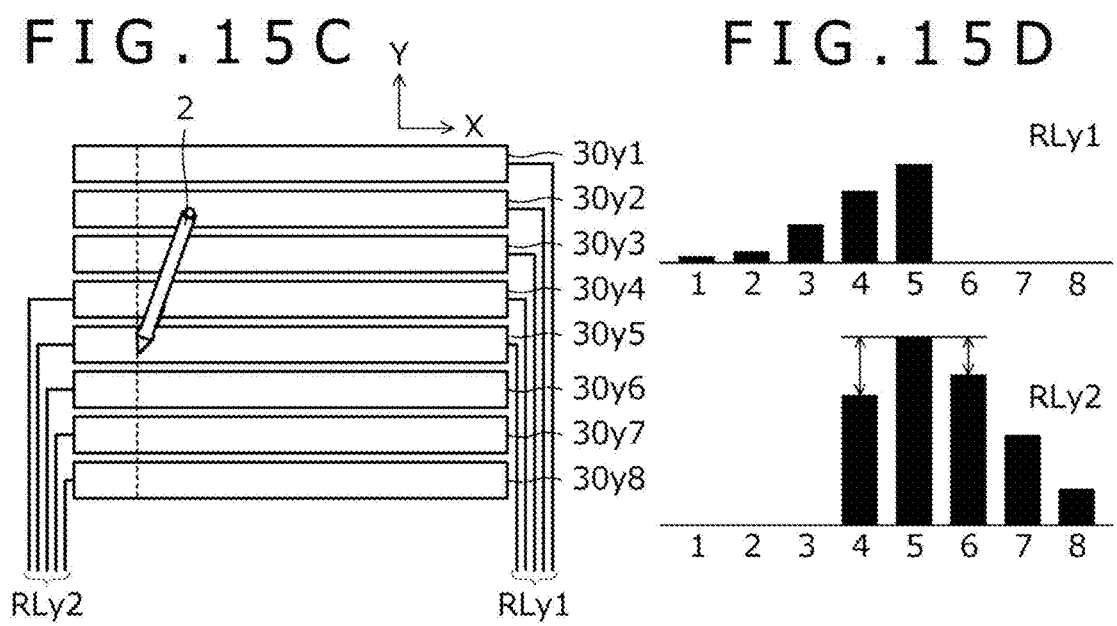

SENSOR, SENSOR CONTROLLER, AND POSITION DETECTION DEVICE

BACKGROUND

Technical Field

The present disclosure relates to a sensor, a sensor controller, and a position detection device.

Background Art

A position detection device of the active capacitance system includes a sensor disposed in a touch surface and a sensor control that detects the position of a pen by use of this sensor. The sensor includes a plurality of sensor electrodes having a plurality of linear electrodes disposed to be arranged in an X direction (hereinafter, referred to as "X electrodes") and a plurality of linear electrodes disposed to be arranged in a Y direction (hereinafter, referred to as "Y electrodes"), a terminal group having a plurality of terminals disposed along one side extending in the X direction in the touch surface, and a plurality of routing lines that connect each of the plurality of sensor electrodes to a corresponding one of the terminals in the terminal group. The plurality of terminals forming the terminal group are each connected to the sensor controller by an interconnect line in a flexible printed board. The sensor controller receives a pen signal transmitted by the pen through each of the sensor electrodes, and derives the position of the pen in the touch sensor on the basis of the distribution of the reception intensity thereof. Examples of the position detection device having such a configuration are disclosed in Japanese Patent Laid-open No. 2021-149161 (Patent Document 1), International Patent Publication WO 2019/235322 (Patent Document 2), and International Patent Publication WO 2019/069696 (Patent Document 3).

However, the above-described position detection device of the related art has a problem that the amount of attenuation of the pen signal in the reception path of the pen signal from the sensor electrode to the sensor controller differs depending on the position of the pen in the touch surface and thus, it is difficult to enhance the accuracy of the position detection of the pen. Specifically, the reception path of the pen signal from the sensor electrode to the sensor controller is configured by the sensor electrode, the routing line, and the interconnect line in the flexible printed board. The length of the reception path of the pen signal in the sensor electrode differs depending on the position of the pen in the extension direction of the sensor electrode. Furthermore, the length of the routing line differs depending on the sensor electrode. As a result, the interconnect resistance of the reception path of the pen signal differs depending on the position of the pen in the touch surface. Thus, the amount of attenuation of the pen signal differs depending on the position of the pen in the touch surface as described above.

Regarding this, in a configuration disclosed in FIG. 3 of Patent Document 3, one part (parts indicated by symbols A and B in FIG. 3 of Patent Document 3) of each of a plurality of routing lines connected to a plurality of Y electrodes is formed with a larger line width than the other part. Particularly regarding the part indicated by symbol A among them, only the routing lines corresponding to approximately half of the Y electrodes disposed at positions relatively remoter from a terminal group are treated as the subject. Thus, the part indicated by symbol A has an effect of decreasing the interconnect resistance of approximately half of the routing lines from the longest routing line and consequently plays a role in decreasing the interconnect resistance difference from the other routing lines (approximately half of the routing lines from the shortest routing line).

However, with the configuration of Patent Document 3, it is impossible to decrease the interconnect resistance difference among approximately half of the routing lines from the shortest routing line. Furthermore, it is also impossible to decrease the difference in the interconnect resistance caused depending on the position of the pen tip in the sensor electrode. Therefore, the effect of improvement in the accuracy of the position detection of the pen, obtained by the configuration of Patent Document 3, is extremely limited.

BRIEF SUMMARY

Therefore, embodiments of the present disclosure provide a sensor that can improve the accuracy of position detection of a pen more effectively than the background technique.

Moreover, in the position detection device of the related art, due to a demand to reduce the size of a bezel in a display disposed to overlap with a sensor, there is a case in which a routing line is connected to one end in the X direction for half of the Y electrodes from one side in the Y direction and the routing line is connected to the other end in the X direction for the remaining half of the Y electrodes. In this case, when the position of the pen tip is present near the boundary of switching of the connection position of the routing line and the position is close to a single side in the X direction, the length of the reception path of the pen signal in the Y electrode greatly differs between two Y electrodes located across the boundary. Thus, the accuracy of the position detection further lowers.

Therefore, embodiments of the present disclosure provide a sensor, a sensor controller, and a position detection device that can detect the position of a pen with high accuracy even in a case in which a routing line is connected to one end in an X direction for half of Y electrodes from one side in a Y direction and the routing line is connected to the other end in the X direction for the remaining half of the Y electrodes.

A sensor according to a first aspect of the present disclosure includes a sensor including a plurality of sensor electrodes disposed from a first end to a second end in a first direction in a touch surface, a plurality of terminals, wherein each of the terminals is disposed for a corresponding one of a plurality of sets of sensor electrodes among the plurality of sensor electrodes and is connected to a sensor controller, and a plurality of routing lines, wherein each of the routing lines connects one of the plurality of sensor electrodes to a corresponding one of the terminals, in which an interconnect resistance per unit length of each of the sensor electrodes becomes lower continuously or in a stepwise manner, according to an interconnect distance from a portion connecting with one of the routing lines corresponding to one of the sensor electrodes, and a difference in the interconnect resistances between any two sensor electrodes among the plurality of sensor electrodes is smaller than a case in which interconnect resistance per unit length in each of the routing lines is constant.

A sensor according to a second aspect of the present disclosure includes a plurality of sensor electrodes, wherein the sensor electrodes extend in a first direction and are arranged in a second direction intersecting the first direction, and wherein a number of the sensor electrodes is n (n≥3), and a plurality of routing lines that respectively connect the plurality of sensor electrodes to a sensor controller, in which m (1≤m≤n−2) of the sensor electrodes from a first side in the second direction among the plurality of sensor electrodes are respectively connected to m of the routing lines corresponding to m of the sensor electrodes at a first end in the first direction, n−m−1 of the sensor electrodes from a second side in the second direction among the plurality of sensor electrodes are respectively connected to n−m−1 of the routing lines corresponding to n−m−1 of the sensor electrodes at a second end in the first direction, an m+1-th sensor electrode from the first side in the second direction among the plurality of sensor electrodes includes a first sub-electrode and a second sub-electrode in each of which a length in the first direction is same as a length of the sensor electrodes other than the m+1-th sensor electrode in the first direction and length in the second direction is shorter than a length of the sensor electrodes other than the m+1-th sensor electrode in the second direction, the first sub-electrode is connected to one of the routing lines corresponding to the first sub-electrode at the first end in the first direction, and the second sub-electrode is connected to one the routing lines corresponding to the second sub-electrode at the second end in the first direction.

A sensor according to a third aspect of the present disclosure includes a plurality of sensor electrodes, wherein the sensor electrodes extend in a first direction and are arranged in a second direction intersecting the first direction, and wherein a number of the sensor electrodes is n (n≥3), and a plurality of routing lines that respectively connect the plurality of sensor electrodes to a sensor controller, in which the sensor electrodes include m (m≥1) first sensor electrodes, k (k≥1) second sensor electrodes, and n−m−k third sensor electrodes sequentially from a first side in the second direction, and the plurality of routing lines include m+k first routing lines that connect a first end in the first direction in each of the first sensor electrodes and the second sensor electrodes to the sensor controller, and n−m second routing lines that connect a second end in the first direction in each of the second sensor electrodes and the third sensor electrodes to the sensor controller.

A sensor controller according to the present disclosure is a sensor controller being used with the sensor according to the third aspect of the present disclosure. The sensor controller selects one of the first routing lines or the second routing lines, and derives a position of a pen in the second direction based on reception intensity of a pen signal acquired through the one of the first routing lines or the second routing lines.

A position detection device according to the present disclosure includes the sensor according to the third aspect of the present disclosure, the sensor controller according to the present disclosure, and a switch disposed corresponding to the second sensor electrodes. The switch, in operation, connects one of the first routing lines or the second routing lines to the sensor controller, regarding each of the second sensor electrodes according to control by the sensor controller, and the sensor controller, in operation, acquires the reception intensity of the pen signal through one of the first routing lines—or the second routing lines by controlling the switch.

According to the first aspect of the present disclosure, it becomes possible to improve the accuracy of position detection of the pen more effectively than the background technique.

According to the second and third aspects of the present disclosure, it becomes possible to detect the position of the pen with high accuracy even in a case in which the routing line is connected to one end in an X direction for half of Y electrodes from one side in a Y direction and the routing line is connected to the other end in the X direction for the remaining half of the Y electrodes.

BRIEF DESCRIPTION OF THE SEVERAL VIEWS OF THE DRAWINGS

FIG. 10A is a partially enlarged view of a sensor according to the background technique of the present disclosure;

FIG. 10B is a partially enlarged view of a sensor according to the second embodiment of the present disclosure;

FIG. 12A is the same diagram as FIG. 10A;

FIG. 12B is a partially enlarged view of a sensor according to a modification of the second embodiment of the present disclosure;

FIG. 13 is a diagram illustrating a configuration of a position detection device according to a third embodiment of the present disclosure in detail;

FIGS. 14A to 14D are diagrams for explaining a problem that occurs when position detection of the pen is executed by use of a sensor according to the background technique of the third embodiment of the present disclosure;

FIGS. 15A to 15D are diagrams for explaining a method for executing position detection of the pen by use of the sensor according to the third embodiment of the present disclosure;

DETAILED DESCRIPTION OF THE PREFERRED EMBODIMENTS

Embodiments of the present disclosure will be described in detail below with reference to the accompanying drawings.

Figure 1:
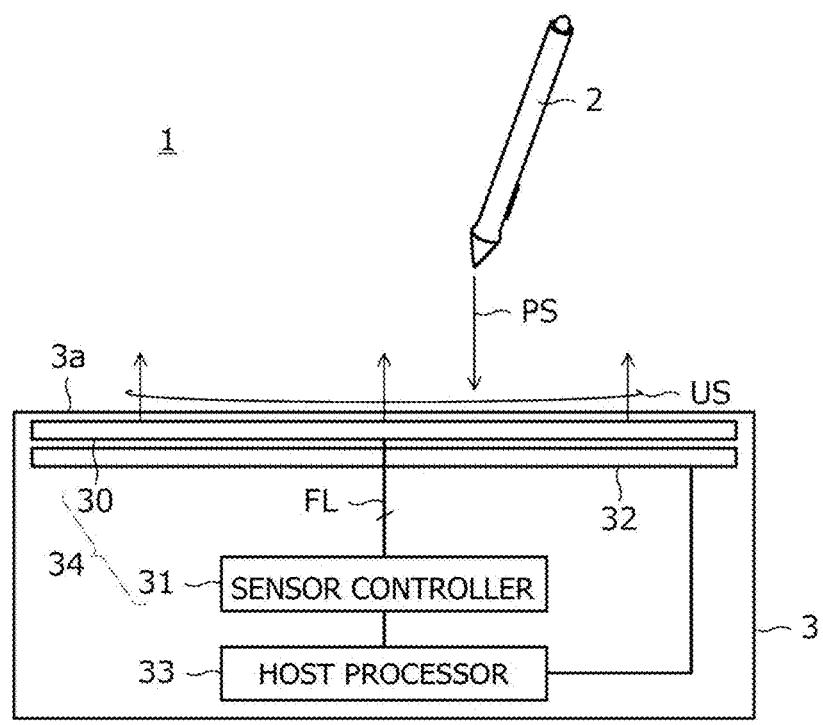
FIG. 1 is a diagram illustrating a system configuration of a position detection system according to a first embodiment of the present disclosure.

FIG. 1 is a diagram illustrating a system configuration of a position detection system 1 according to a first embodiment of the present disclosure. As illustrated in this diagram, the position detection system 1 has a pen 2 and electronic equipment 3 having a touch surface 3a. The pen 2 is an active pen compatible with the active capacitance system. The electronic equipment 3 is, for example, a tablet-type computer and has a sensor 30, a sensor controller 31, a display 32, and a host processor 33, as illustrated in this diagram. In one or more implementation, the sensor controller 31 includes a processor and a memory storing a program that, when executed by the processor, causes the sensor controller 31 to perform the acts of the sensor controller 31 described herein.

The pen 2 is configured to receive an uplink signal US transmitted by the sensor controller 31 through the sensor 30 and transmit a pen signal PS in response to the received uplink signal US. The uplink signal US is a signal periodically transmitted by the sensor controller 31, and has a role in notifying the pen 2 of the transmission timing of the pen signal PS and the reception timing of the next uplink signal US and transmitting a command to the pen 2. The pen 2 that has received the uplink signal US decides the transmission/reception schedule of the pen signal PS and the next uplink signal US on the basis of the reception timing of the uplink signal US, and executes transmission of the pen signal PS and reception of the next uplink signal US, according to the decided transmission/reception schedule. Furthermore, the pen 2 generates the pen signal PS, according to the command included in the uplink signal US.

The pen signal PS is a signal including a position signal that is a non-modulated carrier signal and a data signal that is a carrier signal modulated on the basis of data. The position signal is used for allowing the sensor controller 31 to derive the position of the pen 2. Moreover, the data signal is used for transmitting predetermined data from the pen 2 to the sensor controller 31. The data transmitted by the data signal includes a pen ID assigned to the pen 2 in advance, a writing pressure value indicating the magnitude of the pressure applied to the pen tip of the pen 2, information indicating the on/off-state of a switch disposed on the surface of the pen 2, and the like.

The sensor 30 and the sensor controller 31 form a position detection device 34 that detects the position of the pen 2 in the touch surface 3a. Specifically, first, the sensor 30 includes a plurality of sensor electrodes disposed directly under the touch surface 3a, which is a flat surface. The sensor controller 31 is an integrated circuit connected to the sensor electrodes in the sensor 30 through a plurality of flexible printed circuit (FPC) interconnect lines FL disposed in a flexible printed board. The sensor controller 31 executes processing of periodically transmitting the uplink signal US by use of part or all of the sensor electrodes in the sensor 30 and receiving, through the sensor 30, the pen signal PS transmitted by the pen 2 in response to this uplink signal US.

When receiving the position signal from the pen 2 that has not been detected, the sensor controller 31 derives the position of the pen 2 in the touch surface 3a by acquiring the reception intensity of the position signal at each of all sensor electrodes and deriving a distribution curve of the reception intensity from the result thereof (global scan). In a more specific example, the sensor controller 31 is configured to execute, regarding each of an X direction and a Y direction illustrated in FIG. 2 to be given later, processing of searching for the peak of the acquired reception intensity (maximum intensity) and deriving the distribution curve of the reception intensity on the basis of three values of the reception intensity in total, i.e., the reception intensity as the peak and two values of the reception intensity acquired at the sensor electrodes at both adjacent positions to the sensor electrode corresponding to the peak, to acquire the apex of the distribution curve as the position of the pen 2. Such position derivation processing is referred to as the "three-point method" because three sensor electrodes are used. Note that the sensor controller 31 may derive the position of the pen 2 by the "four-point method" in which, in addition to the three sensor electrodes used in the three-point method, further another sensor electrode (sensor electrode with higher reception intensity out of the two sensor electrodes adjacent to the three sensor electrodes) is used.

On the other hand, when receiving the position signal from the pen 2 that has been detected, the sensor controller 31 updates the position of the pen 2 in the touch surface 3a by acquiring the reception intensity of the position signal at each of a predetermined number of sensor electrodes located near the position derived last time and deriving a distribution curve of the reception intensity from the result thereof (local scan). The position derivation in this case can also be executed by the above-described three-point method or four-point method.

The sensor controller 31 in a case of receiving the data signal from the pen 2 acquires the data transmitted by the pen 2 by receiving the data signal at one or a predetermined number of sensor electrodes located near the position derived last time and demodulating the data signal. The sensor controller 31 is configured to supply the position derived in the above-described manner and the acquired data to the host processor 33 every time the position is derived and the data is acquired.

The host processor 33 is a central processing unit of the electronic equipment 3, and plays a role in executing an operating system of the electronic equipment 3 and various applications by reading out a program stored in a memory that is not illustrated and executing the program. A rendering application is included in the applications executed by the host processor 33.

The rendering application is a program that causes the host processor 33 to execute processing of generating stroke data on the basis of the position and the data sequentially supplied from the sensor controller 31. The processing that the host processor 33 is caused to execute by the rendering application includes, besides the above-described processing, processing of storing the generated stroke data in the memory, processing of generating a video signal by rendering the generated stroke data, processing of displaying the generated stroke data on the display 32 by supplying the generated video signal to the display 32, and the like.

The display 32 is a display device having a display panel having a plurality of pixels arranged in a matrix and a drive circuit that executes any display by driving this display panel. In a specific example, the display 32 can include a liquid crystal display, an organic electroluminescence (EL) display, electronic paper, or the like. The drive circuit is configured to drive the pixels of the display panel according to the video signal supplied from the host processor 33.

Figure 2:
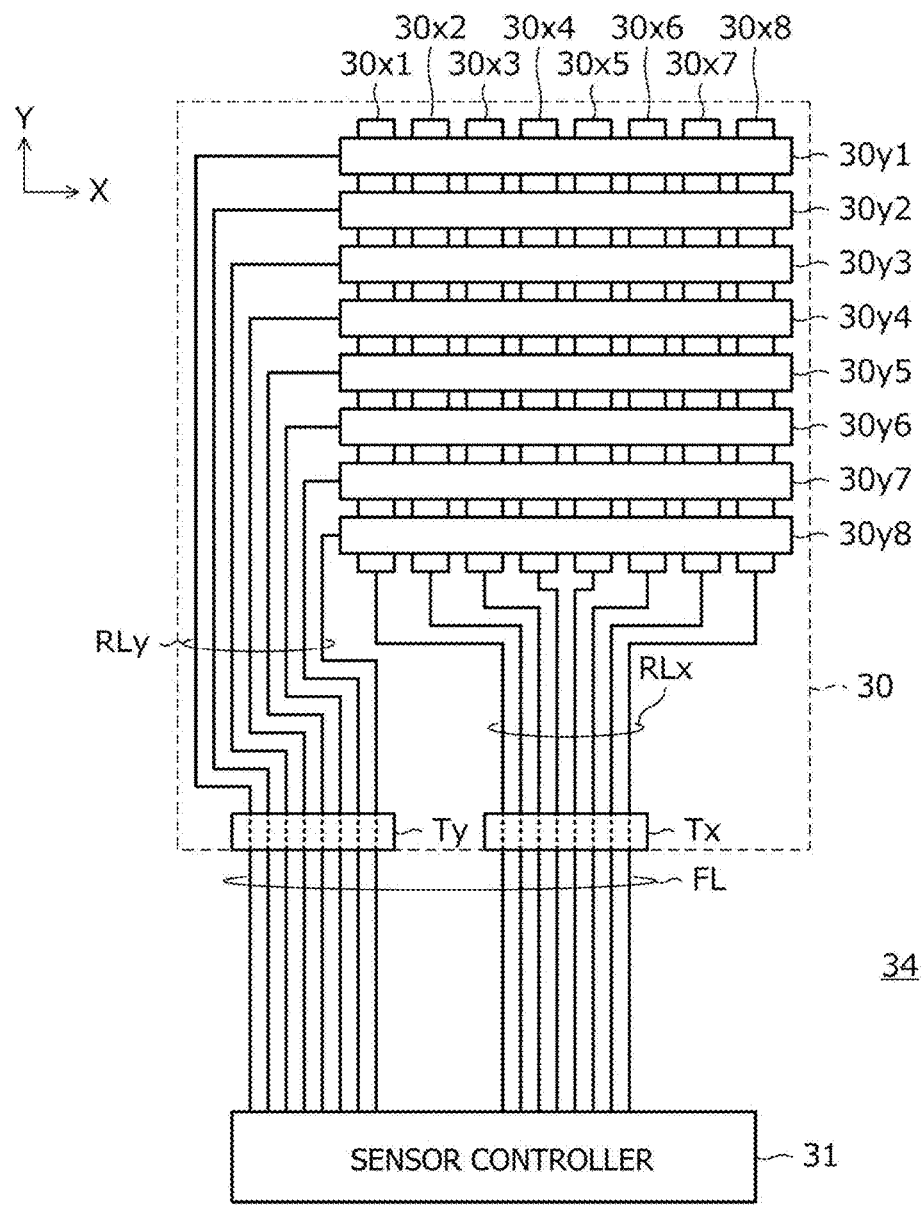
FIG. 2 is a diagram illustrating, in detail, a configuration of a position detection device illustrated in FIG. 1.

FIG. 2 is a diagram illustrating a configuration of the position detection device 34 in detail. Note that this diagram does not reflect enlargement of the width and the like to be described with reference to FIGS. 4A to 7B to be given later. This point is the same also in FIGS. 9 to 15D to be given later.

As illustrated in FIG. 2, the sensor 30 has, as the above-described plurality of sensor electrodes, a plurality of X electrodes 30x disposed to be arranged from one end to the other end in the X direction in the touch surface 3a and a plurality of Y electrodes 30y disposed to be arranged from one end to the other end in the Y direction (a direction orthogonal to the X direction) in the touch surface 3a. The plurality of X electrodes 30x are each formed of a linear conductor being extended in the Y direction, and are disposed at equal intervals in the X direction. Furthermore, the plurality of Y electrodes 30y are each formed of a linear conductor being extended in the X direction, and are disposed at equal intervals in the Y direction. Note that only eight X electrodes 30x and eight Y electrodes 30y (X electrodes 30x1 to 30x8 and Y electrodes 30y1 to 30y8) are illustrated in FIG. 2 and the diagrams to be given later for ease of viewing of the drawings but actually more X electrodes 30x and Y electrodes 30y are disposed.

The X electrodes 30x and the Y electrodes 30y are configured to avoid, as much as possible, interference with the visibility of the display 32 disposed on the lower side of the sensor 30 as viewed from the touch surface 3a. As a specific example, the X electrodes 30x and the Y electrodes 30y may be plate-shaped conductors formed of a transparent material such as indium tin oxide (ITO), or may be formed of mesh-shaped conductors. In the following, unless otherwise stated, the description is continued on the basis of the assumption that the X electrodes 30x and the Y electrodes 30y are plate-shaped conductors formed of a transparent material.

Moreover, the sensor 30 has a terminal group including a plurality of terminals Tx each disposed for a corresponding one of sets of a plurality of X electrodes 30x and a plurality of terminals Ty each disposed for a corresponding one of sets of a plurality of Y electrodes 30y, a plurality of routing lines RLx that connect each of the plurality of X electrodes 30x to the corresponding terminal Tx, and a plurality of routing lines RLy that connect each of the plurality of Y electrodes 30y to the corresponding terminal Ty. The plurality of routing lines RLx and RLy are each extended in a bezel area of the display 32 in plan view. The terminals Tx and Ty forming the terminal group are disposed to line up along a side of the setting area of the sensor 30 (rectangular area) on one side in the Y direction (side on the lower side of the drawing). The terminals Tx and Ty are each connected to the sensor controller 31 by a plurality of FPC interconnect lines FL disposed in the flexible printed board.

In the present embodiment, the plurality of routing lines RLy are each connected to the corresponding Y electrode 30y at the other end of this Y electrode 30y in the X direction (end portion on the left side of the drawing). Furthermore, the plurality of routing lines RLx are each connected to the corresponding X electrode 30x at one end of this X electrode 30x in the Y direction (end portion on the lower side of the drawing).

Figure 3A:
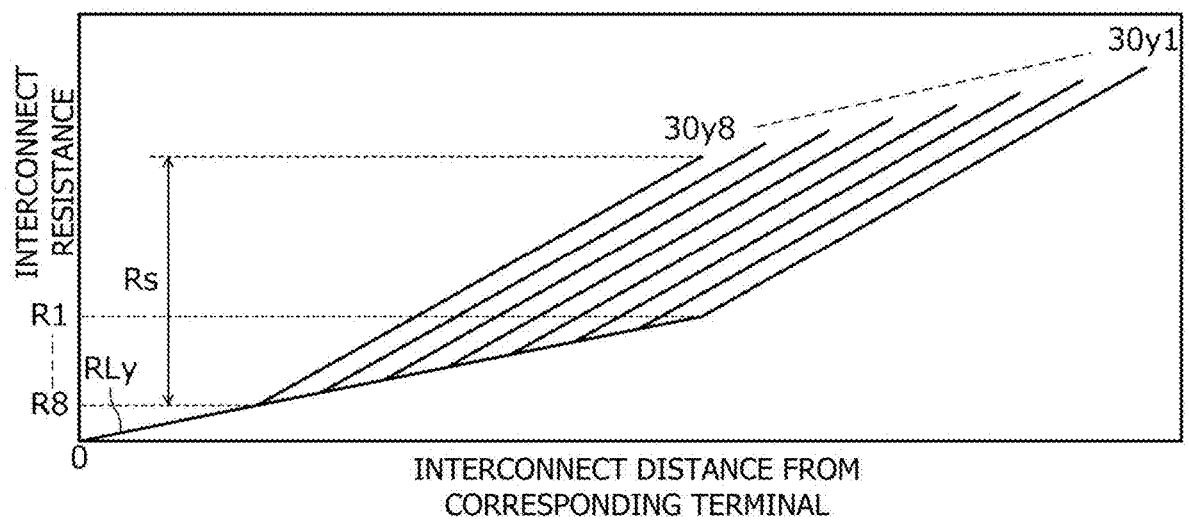
FIG. 3A is a diagram illustrating a relation between the interconnect distance from a corresponding terminal and the interconnect resistance of the part from the corresponding terminal to the position indicated by this interconnect distance, regarding routing lines and Y electrodes according to a comparative example of the first embodiment of the present disclosure.
Figure 3B:
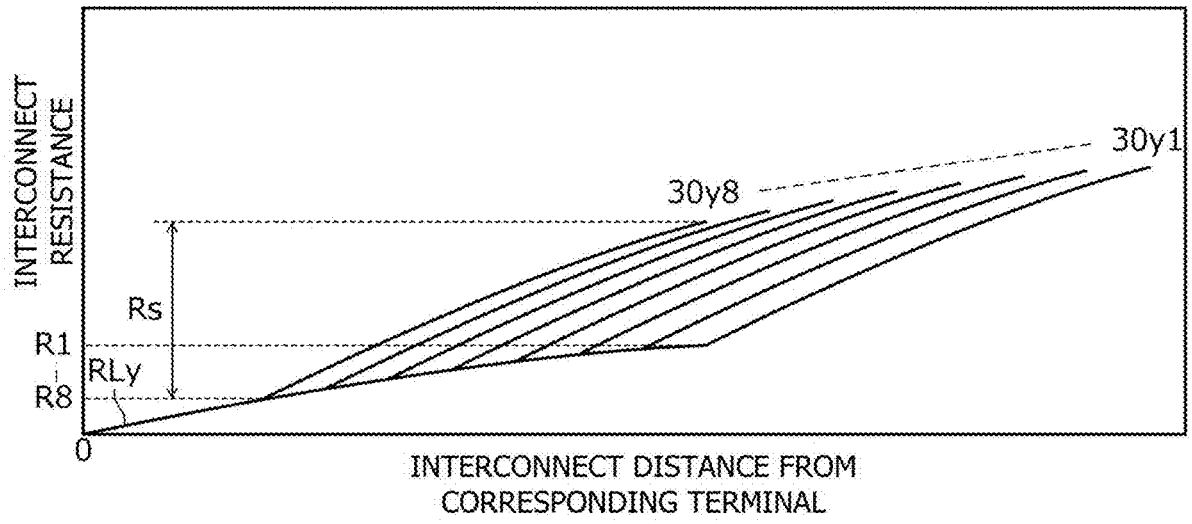
FIG. 3B is a diagram illustrating a relation between the interconnect distance from the corresponding terminal and the interconnect resistance of the part from the corresponding terminal to the position indicated by this interconnect distance, regarding the routing lines and the Y electrodes according to a working example of the first embodiment of the present disclosure.

FIG. 3A is a diagram illustrating a relation between the interconnect distance from the corresponding terminal Ty and the interconnect resistance of the part from the corresponding terminal Ty to the position indicated by this interconnect distance, regarding the routing lines RLy and the Y electrodes 30y according to a comparative example of the present embodiment. FIG. 3B is a diagram illustrating a relation between the interconnect distance from the corresponding terminal Ty and the interconnect resistance of the part from the corresponding terminal Ty to the position indicated by this interconnect distance, regarding the routing lines RLy and the Y electrodes 30y according to a working example of the present embodiment. The outline of a characteristic part of the sensor 30 in the present embodiment will be described below with reference to these FIGS. 3A and 3B.

In the comparative example of FIG. 3A, the routing lines RLy and the respective Y electrode 30y are each formed in such a manner that the interconnect resistance per unit length has a constant value. When a case in which each routing line RLy and each Y electrode 30y are plate-shaped conductors is taken as an example, this means that the resistivity, the width, and the thickness of the conductor have constant values. In this case, the interconnect resistance of the routing lines RLy and the Y electrodes 30y is proportional to the interconnect distance of each of them. Thus, as illustrated in FIG. 3A, the interconnect resistance from the terminal Ty to any position linearly increases except for the connecting node between the routing line RLy and the Y electrode 30y.

In the comparative example of FIG. 3A, when the interconnect resistance of each Y electrode 30y is defined as Rs, the difference in the interconnect resistance attributed to the difference in the length of the reception path of the pen signal PS in the Y electrode 30y is at most Rs. Moreover, when the interconnect resistance of the routing line RLy corresponding to the Y electrode 30ym (m is a natural number of 1 to 7) is defined as Rm and the interconnect resistance of the routing line RLy corresponding to the Y electrode 30yn (n is a natural number larger than m and equal to or smaller than 8) is defined as Rn, the difference in the interconnect resistance attributed to the difference in the length of the routing line RLy is Rm−Rn between the Y electrode 30ym and the Y electrode 30yn.

In the one embodiment example of the present embodiment, each Y electrode 30y is formed in such a manner that the interconnect resistance per unit length continuously becomes lower according to the interconnect distance from the portion connecting with the corresponding routing line RLy as illustrated in FIG. 3B. This causes the interconnect resistance Rs to become lower than that in the comparative example of FIG. 3A. Thus, the difference in the interconnect resistance attributed to the difference in the length of the reception path of the pen signal PS in the Y electrode 30y can be made small, compared with the comparative example of FIG. 3A. Note that, although FIG. 3B illustrates the example in which each Y electrode 30$y$ is formed in such a manner that the interconnect resistance per unit length continuously becomes lower, each Y electrode 30$y$ may be formed in such a manner that the interconnect resistance per unit length becomes lower in a stepwise manner.

Furthermore, in the one embodiment example of the present embodiment, each routing line RLy is formed in such a manner that the difference Rm−Rn in the interconnect resistance becomes small between any two Y electrodes 30$y$ compared with a case in which the interconnect resistance per unit length in each routing line RLy is constant. Specifically, each routing line RLy is formed in such a manner that the interconnect resistance per unit length continuously becomes lower according to the interconnect distance from the portion connecting with the corresponding terminal Ty, as illustrated in FIG. 3B. This causes the interconnect resistance difference Rm−Rn to become smaller than that in the comparative example of FIG. 3A, regarding any m and n. Thus, the difference in the interconnect resistance attributed to the difference in the length of the routing line RLy can be made small, compared with the comparative example of FIG. 3A. Note that, although FIG. 3B illustrates the example in which each routing line RLy is formed in such a manner that the interconnect resistance per unit length continuously becomes lower, each routing line RLy may be formed in such a manner that the interconnect resistance per unit length becomes lower in a stepwise manner.

Figure 4A:
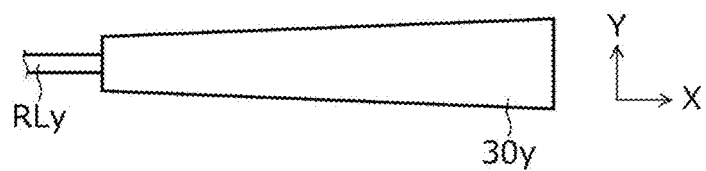
FIGS. 4A and 4B are diagrams illustrating examples of the specific shape of the Y electrode according to the first embodiment of the present disclosure (when the Y electrode is formed of a plate-shaped conductor)

FIGS. 4A to 5D are diagrams illustrating examples of the specific shape of the Y electrode 30$y$ according to the present embodiment. FIGS. 4A and 4B illustrate cases in which the Y electrode 30$y$ is formed of a plate-shaped conductor. FIGS. 5A to 5D illustrate cases in which the Y electrode 30$y$ is formed of a mesh-shaped conductor.

Figure 4B:
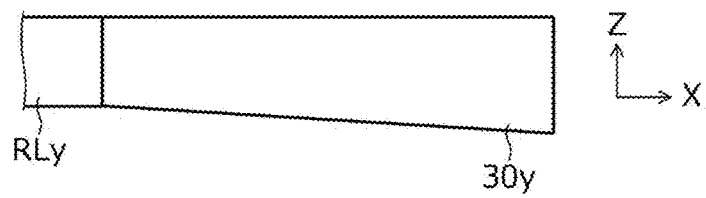

An example illustrated in FIG. 4A is one example of the Y electrode 30$y$ formed in such a manner that the width continuously enlarges according to the interconnect distance from the portion connecting with the corresponding routing line RLy. Note that, although this diagram illustrates the example in which the width continuously enlarges, the Y electrode 30$y$ may be formed in such a manner that the width enlarges in a stepwise manner. Moreover, an example illustrated in FIG. 4B is one example of the Y electrode 30$y$ formed in such a manner that the thickness continuously increases according to the interconnect distance from the portion connecting with the corresponding routing line RLy. A Z direction illustrated is the direction perpendicular to the touch surface 3$a$. Note that, although this diagram illustrates the example in which the thickness continuously increases, the Y electrode 30$y$ may be formed in such a manner that the thickness increases in a stepwise manner. Either example implements forming the Y electrodes 30$y$ that are plate-shaped conductors in such a manner that the interconnect resistance per unit length becomes lower continuously or in a stepwise manner according to the interconnect distance from the portion connecting with the corresponding routing line RLy.

Figure 5A:
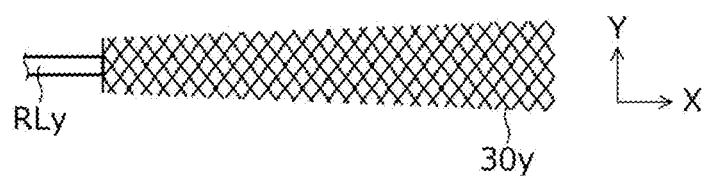
FIGS. 5A to 5D are diagrams illustrating examples of the specific shape of the Y electrode according to the first embodiment of the present disclosure (when the Y electrode is formed of a mesh-shaped conductor)
Figure 5B:
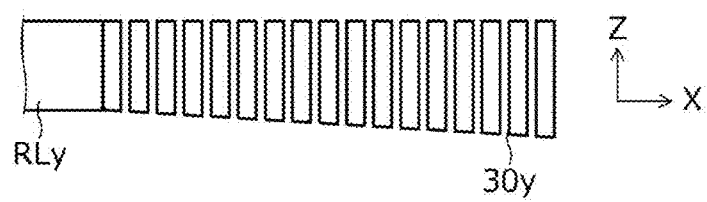

An example illustrated in FIG. 5A is one example of the Y electrode 30$y$ formed in such a manner that the width continuously enlarges according to the interconnect distance from the portion connecting with the corresponding routing line RLy similarly to the example of FIG. 4A. The example of FIG. 5A is similar to the example of FIG. 4A also in that the Y electrode 30$y$ may be formed in such a manner that the width enlarges in a stepwise manner. Furthermore, an example illustrated in FIG. 5B is one example of the Y electrode 30$y$ formed in such a manner that the thickness continuously increases according to the interconnect distance from the portion connecting with the corresponding routing line RLy, as in the example of FIG. 4B. The example of FIG. 5B is similar to the example of FIG. 4A also in that the Y electrode 30$y$ may be formed in such a manner that the thickness increases in a stepwise manner. Either example implements forming the Y electrodes 30$y$ that are mesh-shaped conductors in such a manner that the interconnect resistance per unit length becomes lower continuously or in a stepwise manner according to the interconnect distance from the portion connecting with the corresponding routing line RLy.

Figure 5C:
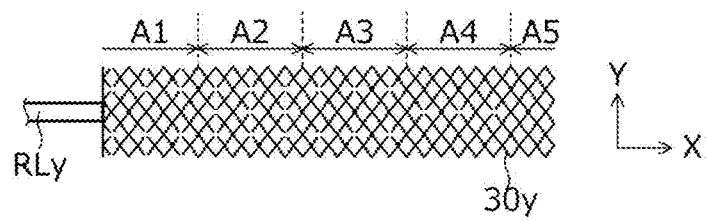

An example illustrated in FIG. 5C is one example of the Y electrode 30$y$ formed in such a manner that the number of intersections per unit length in a mesh-shaped conductor increases according to the interconnect distance from the portion connecting with the corresponding routing line RLy. In the example of this diagram, the number of intersections per unit length increases one by one in order of areas A1 to A5 illustrated. Moreover, an example illustrated in FIG. 5B is one example of the Y electrode 30$y$ formed in such a manner that the mesh density (interconnect density of a mesh-shaped conductor) increases according to the interconnect distance from the portion connecting with the corresponding routing line RLy. A conductor illustrated by dashed lines in this diagram is a conductor that is not present in practice. In the example of this diagram, the mesh density increases in a stepwise manner in order of areas A1 to A4 illustrated. These examples also implement forming the Y electrodes 30$y$ that are mesh-shaped conductors in such a manner that the interconnect resistance per unit length becomes lower in a stepwise manner according to the interconnect distance from the portion connecting with the corresponding routing line RLy.

Figure 5D:
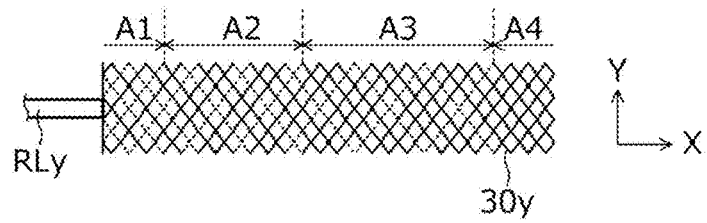

Here, the reason that the thickness of the Y electrode 30$y$ increases downward according to the interconnect distance from the portion connecting with the corresponding routing line RLy in FIGS. 4B and 5D is because the Y electrode 30$y$ is formed by an imprinting technique. That is, the Y electrode 30$y$ is formed by forming a groove having the shape of the Y electrode 30$y$ and burying a conductor therein. The increase in the thickness of the Y electrode 30$y$ is implemented by adjusting the depth of this groove. This point is the same also regarding the routing line RLy to be described with reference to FIGS. 7A and 7B to be given later, the X electrode 30$x$, and the routing line RLx.

FIGS. 6A to 7B are diagrams illustrating examples of the specific shape of the routing line RLy according to the present embodiment. Note that, although the actual routing lines RLy have portions that bend midway as illustrated in FIG. 2, representation of the bending is omitted in FIGS. 6A to 7B.

Figure 6A:
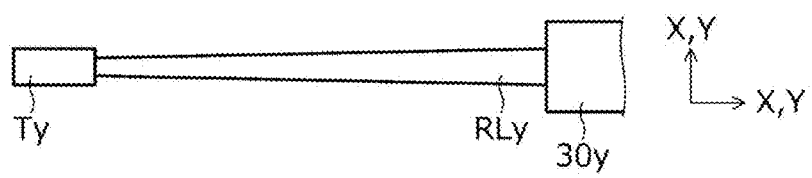
FIGS. 6A to 6C are diagrams illustrating examples of the specific shape of the routing line according to the first embodiment of the present disclosure.
Figure 6B:
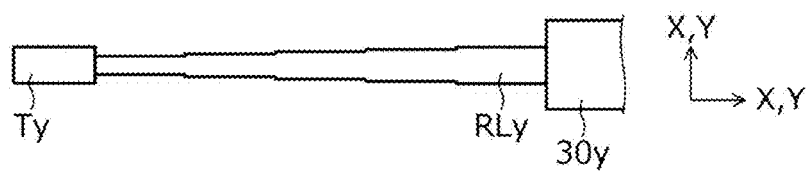
Figure 6C:
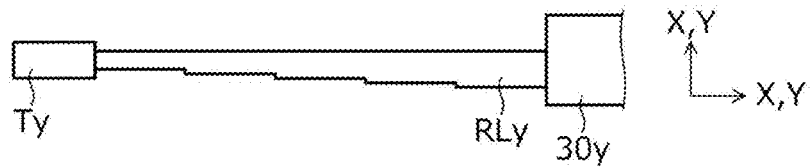

An example illustrated in FIG. 6A is one example of the routing line RLy formed in such a manner that the width continuously enlarges according to the interconnect distance from the portion connecting with the corresponding terminal Ty. Furthermore, examples illustrated in FIGS. 6B and 6C are each one example of the routing line RLy formed in such a manner that the width enlarges in a stepwise manner according to the interconnect distance from the portion connecting with the corresponding terminal Ty. FIG. 6B illustrates an example in which the width is enlarged toward both sides in the length direction of the routing line RLy. FIG. 6C illustrates an example in which the width is enlarged toward only one side in the length direction of the routing line RLy. These examples implement forming the routing lines RLy in such a manner that the interconnect resistance per unit length becomes lower continuously or in a stepwise manner according to the interconnect distance from the portion connecting with the corresponding terminal Ty.

Figure 7A:
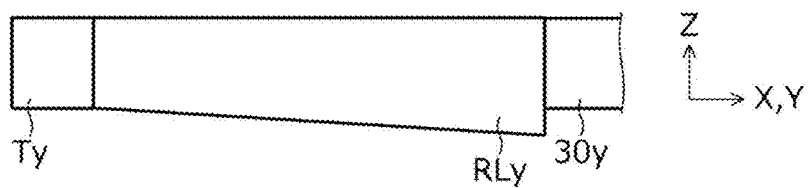
FIGS. 7A and 7B are diagrams illustrating examples of the specific shape of the routing line according to the first embodiment of the present disclosure.
Figure 7B:
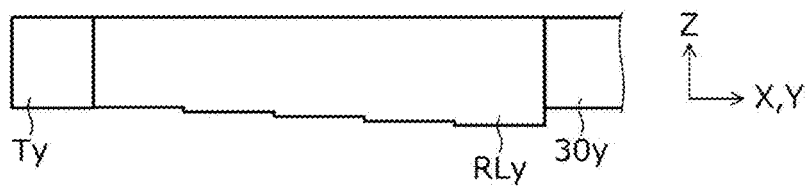

An example illustrated in FIG. 7A is one example of the routing line RLy formed in such a manner that the thickness continuously increases according to the interconnect distance from the portion connecting with the corresponding terminal Ty. Moreover, an example illustrated in FIG. 7B is one example of the routing line RLy formed in such a manner that the thickness increases in a stepwise manner according to the interconnect distance from the portion connecting with the corresponding terminal Ty. These examples also implement forming the routing lines RLy in such a manner that the interconnect resistance per unit length becomes lower continuously or in a stepwise manner according to the interconnect distance from the portion connecting with the corresponding terminal Ty.

As described above, according to the sensor 30 of the present embodiment, each Y electrode 30y is formed in such a manner that the interconnect resistance per unit length continuously becomes lower according to the interconnect distance from the portion connecting with the corresponding routing line RLy. In addition, each routing line RLy is formed in such a manner that the difference in the interconnect resistance becomes small between any two Y electrodes 30y, compared with a case in which the interconnect resistance per unit length in each routing line RLy is constant. Thus, it becomes possible to decrease the difference in the interconnect resistance of the reception path of the pen signal PS caused by the difference in the position of the pen in the touch surface. Therefore, the accuracy of the position detection of the pen can be improved more effectively than the configuration of Patent Document 3 described above.

In the present embodiment, description has been given of the examples in which the interconnect resistance is adjusted through adjustment of either one of the width and the thickness, regarding each of the Y electrode 30y and the routing line RLy. However, the interconnect resistance may be adjusted through adjustment of both the width and the thickness. Furthermore, the interconnect resistance may be adjusted through adjustment of the width or the thickness, regarding only either one of the Y electrode 30y and the routing line RLy.

In addition, although description has been given with focus on the Y electrode 30y and the routing line RLy in the present embodiment, the present disclosure can be similarly applied also to the X electrode 30x and the routing line RLx.

Moreover, in the present embodiment, description has been given of the examples in which each Y electrode 30y and each routing line RLy are formed in such a manner that the interconnect resistance per unit length becomes lower continuously or in a stepwise manner. However, when it is possible to lower the interconnect resistance per unit length across the entire length of each Y electrode 30y and each routing line RLy, this lowering across the entire length may be employed. The specific method for lowering the interconnect resistance per unit length across the entire length is not particularly limited. For example, the width may be enlarged across the entire length, or the thickness may be increased across the entire length, or replacement by a material with low resistivity may be executed.

Figure 8A:
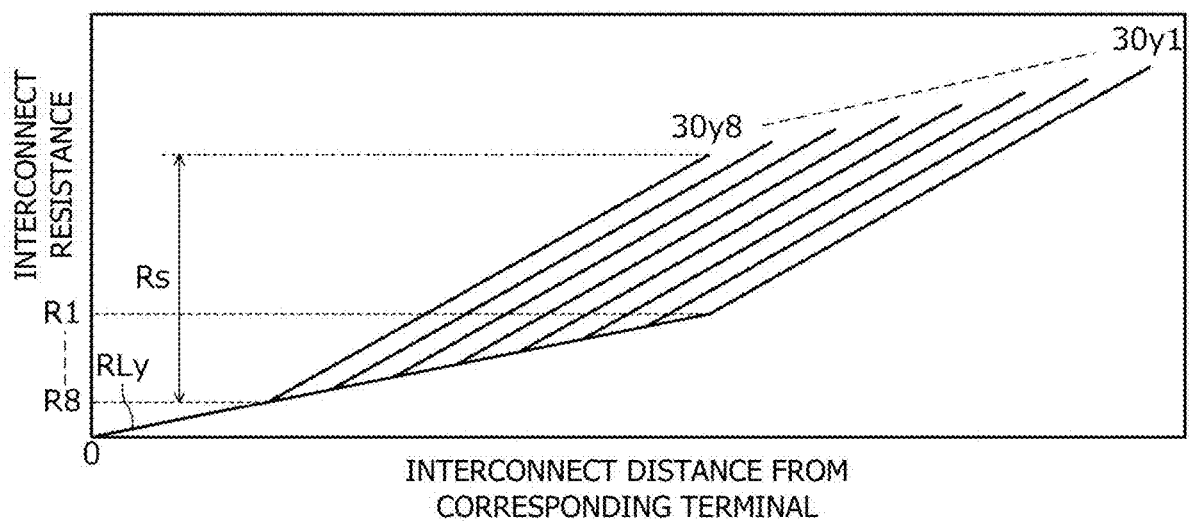
FIG. 8A is the same diagram as FIG. 3A.
Figure 8B:
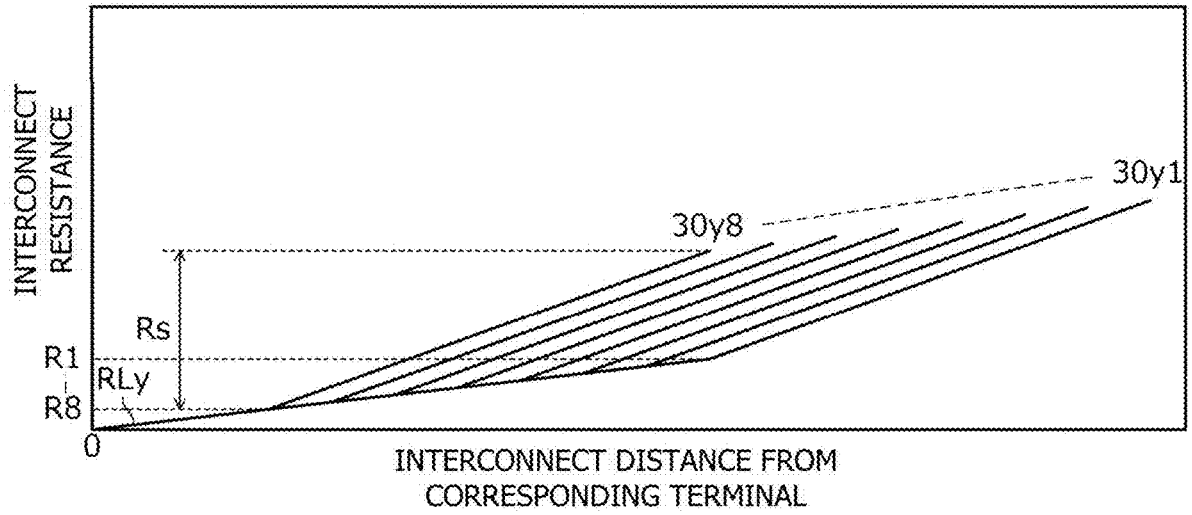
FIG. 8B is a diagram illustrating a relation between the interconnect distance from the corresponding terminal and the interconnect resistance of the part from the corresponding terminal to the position indicated by this interconnect distance, regarding the routing lines and the Y electrodes according to a modification of the first embodiment of the present disclosure.

FIG. 8B is a diagram illustrating a relation between the interconnect distance from the corresponding terminal Ty and the interconnect resistance of the part from the corresponding terminal Ty to the position indicated by this interconnect distance, regarding the routing lines RLy and the Y electrodes 30y according to a modification of the present embodiment. FIG. 8A is the same diagram as FIG. 3A. FIG. 8B illustrates an example in which the interconnect resistance per unit length is lowered compared with the comparative example illustrated in FIG. 8A across the entire length of each Y electrode 30y and each routing line RLy. This can also decrease the difference in the interconnect resistance of the reception path of the pen signal caused by the difference in the position of the pen in the touch surface. Thus, as in the present embodiment, the accuracy of the position detection of the pen can be improved more effectively than the configuration of Patent Document 3 described above.

Next, a position detection system 1 according to a second embodiment of the present disclosure will be described. The position detection system 1 according to the present embodiment is different from the position detection system 1 according to the first embodiment in that the sensor 30 is configured in such a manner that the routing line RLy is connected to one end in the X direction for half of the Y electrodes 30y from one side in the Y direction and the routing line RLy is connected to the other end in the X direction for the remaining half of the Y electrodes 30y. Furthermore, the position detection system 1 according to the present embodiment is different from the position detection system 1 according to the first embodiment also in that one of two Y electrodes 30y located across the boundary of switching of the connection position of the routing line RLy is divided into two sub-electrodes in order to allow achievement of high accuracy of the position detection even with such a configuration. In the other points, the position detection system 1 according to the present embodiment is similar to the position detection system 1 according to the first embodiment. Thus, in the following, the description is continued with focus on the differences from the position detection system 1 according to the first embodiment.

Figure 9:
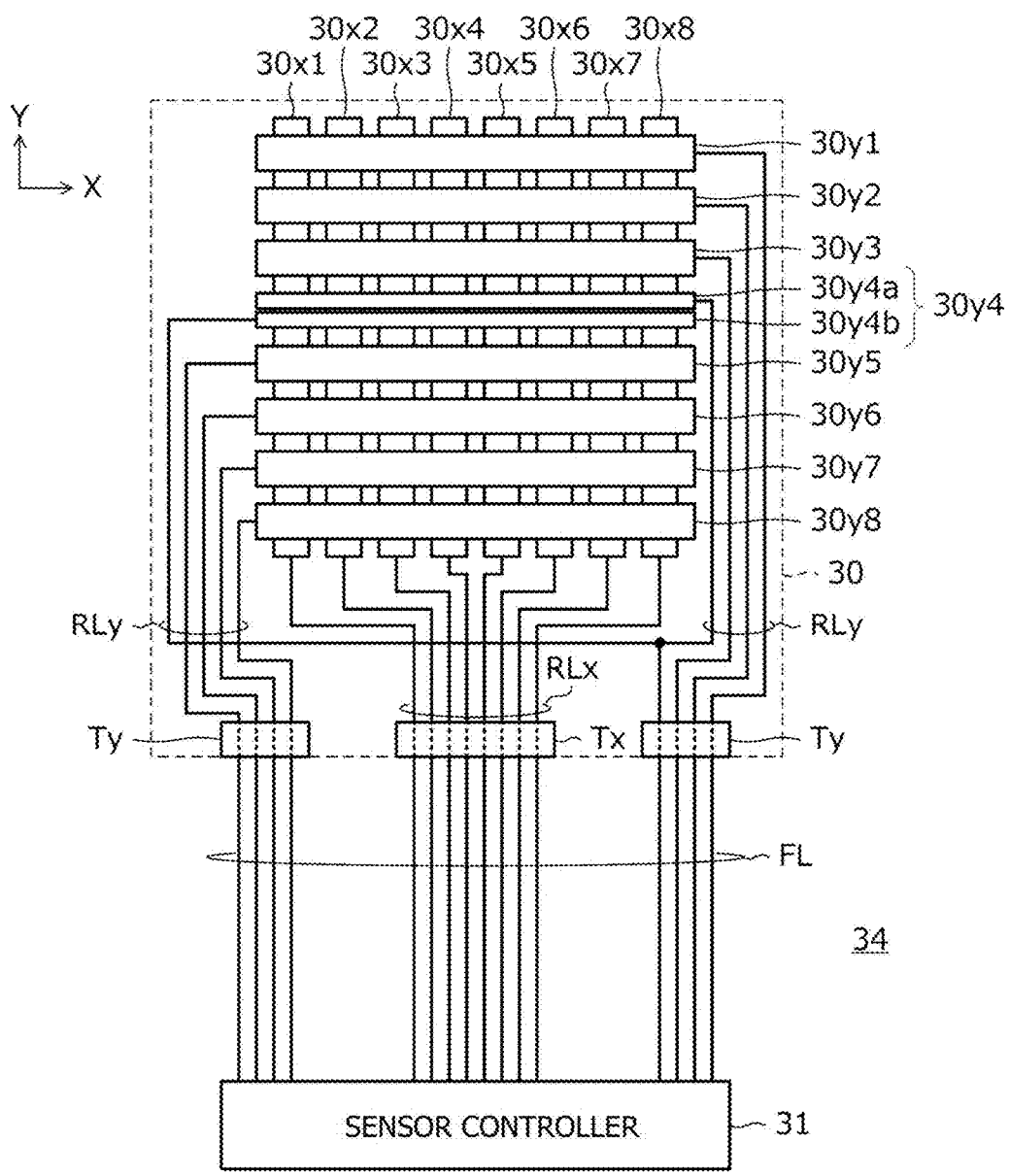
FIG. 9 is a diagram illustrating a configuration of a position detection device according to a second embodiment of the present disclosure in detail.

FIG. 9 is a diagram illustrating a configuration of a position detection device 34 according to the present embodiment in detail. As illustrated in this diagram, in the present embodiment, among n (n is a natural number equal to or larger than 3 and, in the present embodiment, n=8) Y electrodes 30y, m (1≤m≤n−2 and, in the present embodiment, m=3) Y electrodes 30y from one side in the Y direction are connected to the corresponding routing line RLy at one end in the X direction (end portion on the right side of the drawing). Furthermore, n−m−1 (in the present embodiment, four) Y electrodes 30y from the other side in the Y direction among the n Y electrodes 30y are connected to the corresponding routing line RLy at the other end in the X direction (end portion on the left side of the drawing).

Moreover, the m+1-th Y electrode 30y (in the present embodiment, fourth Y electrode 30y4) from the one side in the Y direction among the n Y electrodes 30y has a first sub-electrode 30y4a and a second sub-electrode 30y4b in each of which the length in the X direction is the same as the length of the other Y electrodes 30y in the X direction and the length in the Y direction is shorter than the length of the other Y electrodes 30y in the Y direction. It is sufficient that the specific length of each of the first sub-electrode 30y4a and the second sub-electrode 30y4b in the Y direction may be, for example, half the length of the other Y electrodes 30y. The first sub-electrode 30y4a is extended on the one side in the Y direction relative to the second sub-electrode 30y4b in such a state as to be separate from the second sub-electrode 30y4b physically and electrically. Furthermore, the first sub-electrode 30y4a is connected to the corresponding routing line RLy at one end in the X direction, and the second sub-electrode 30y4b is connected to the corresponding routing line RLy at the other end in the X direction. The routing line RLy connected to the first sub-electrode 30y4a and the routing line RLy connected to the second sub-electrode 30y4b are connected in the bezel area and are connected to the same terminal Ty.

FIG. 10A is a partially enlarged view of the sensor 30 according to the background technique of the present disclosure. FIG. 10B is a partially enlarged view of the sensor 30 according to the present embodiment. In these diagrams, each Y electrode 30y is illustrated as a mesh-shaped conductor. However, each Y electrode 30y may be a plate-shaped conductor. This point is the same also in FIGS. 12A and 12B to be given later.

First, when attention is paid to FIG. 10A, in the sensor 30 according to the background technique of the present disclosure, the Y electrode 30y4 is formed of one electrode similar to the Y electrodes 30y3, 30y5, and the like and is connected to the routing line RLy at one end in the X direction. A consideration is made regarding a case in which, in such a sensor 30 according to the background technique, the pen tip of the pen 2 is present at a position close to the other end of the Y electrode 30y4 in the X direction (specifically, a position at a distance $L_1(<L)$ from the other end in the X direction in the entire length L of the Y electrode 30y4 in the X direction, this position is the same in FIG. 10B to be described later), as illustrated in the diagram. In this case, according to the above-described three-point method, the sensor controller 31 derives the position of the pen 2 on the basis of the reception intensity of the pen signal PS at each of three Y electrodes 30y3 to 30y5. However, the pen tip of the pen 2 is present close to the other end of the Y electrode 30y4 in the X direction, and the length of the reception path of the pen signal PS in the Y electrode 30y greatly differs between the Y electrodes 30y3 and 30y4 and the Y electrode 30y5. Thus, derivation of the position of the pen 2 with high accuracy cannot be expected.

Figure 11A:
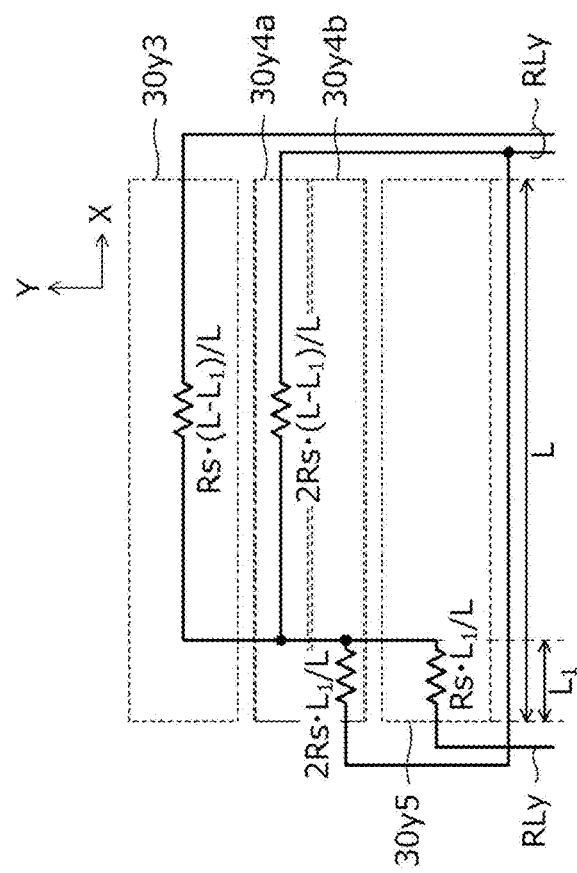
FIG. 11A is a schematic circuit diagram of the sensor according to the background technique of the present disclosure in a case in which a pen is present at a position illustrated in FIG. 10A.

FIG. 11A is a schematic circuit diagram of the sensor 30 according to the background technique of the present disclosure in a case in which the pen 2 is present at the position illustrated in FIG. 10A. As illustrated in this diagram, in this case, the interconnect resistance of the reception path of the pen signal PS formed in the Y electrodes 30y is $Rs \cdot (L-L_1)/L$ in the Y electrodes 30y3 and 30y4 and is $Rs \cdot L_1/L$ in the Y electrode 30y5. Therefore, the interconnect resistance difference between the Y electrodes 30y3 and 30y4 and the Y electrode 30y5 is $Rs \cdot (L-L_1)/L - Rs \cdot L_1/L = Rs \cdot (L-2L_1)/L$. Thus, corresponding to this interconnect resistance difference, a difference is generated between the reception intensity of the pen signal PS received via the Y electrode 30y3 or 30y4 and the reception intensity of the pen signal PS received via the Y electrode 30y5.

Referring back to FIGS. 10A and 10B, when attention is paid to FIG. 10B next, in the sensor 30 according to the present embodiment, the Y electrode 30y4 has the first sub-electrode 30y4a and the second sub-electrode 30y4b as described above. In such a sensor 30 according to the present embodiment, when the pen tip of the pen 2 is present at a position close to the other end of the Y electrode 30y4 in the X direction, as in FIG. 10A, the interconnect resistance of the reception path of the pen signal PS in the Y electrode 30y4 is the combined resistance of the interconnect resistance of the reception path of the pen signal PS formed in the first sub-electrode 30y4a and the interconnect resistance of the reception path of the pen signal PS formed in the second sub-electrode 30y4b.

Figure 11B:
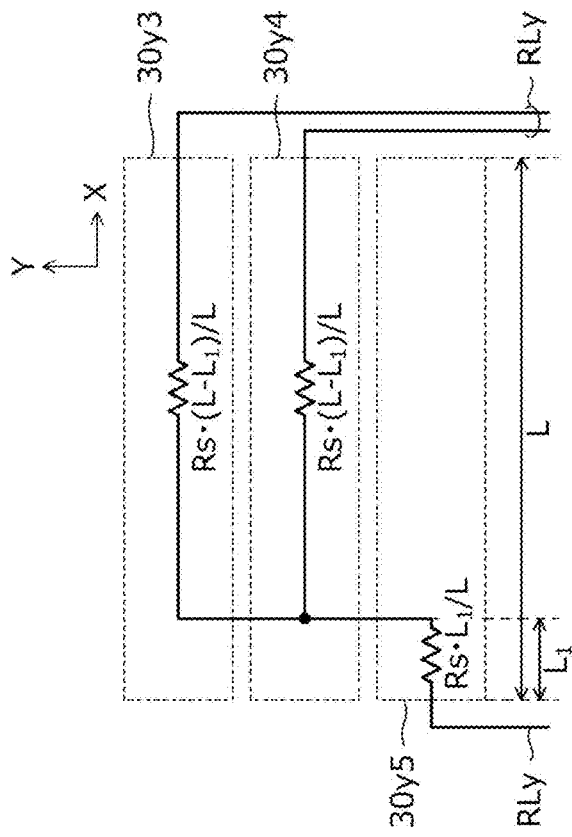
FIG. 11B is a schematic circuit diagram of the sensor according to the present embodiment in a case in which the pen is present at a position illustrated in FIG. 10B.

FIG. 11B is a schematic circuit diagram of the sensor 30 according to the present embodiment in a case in which the pen 2 is present at the position illustrated in FIG. 10B. As is understood from this diagram, the interconnect resistance of the reception path of the pen signal PS in the Y electrode 30y4 in this case is the combined resistance $2Rs \cdot L_1(L-L_1)/L^2$ of the interconnect resistance $2Rs \cdot (L-L_1)/L$ of the reception path via the first sub-electrode 30y4a and the interconnect resistance $2Rs \cdot L_1/L$ of the reception path via the second sub-electrode 30y4b. The interconnect resistance of the reception path of the pen signal PS formed in the Y electrodes 30y3 and 30y5 is the same as that in the case of FIG. 11A. Therefore, the interconnect resistance difference between the Y electrode 30y3 and the Y electrode 30y4 is $Rs \cdot (L-L_1)/L - 2Rs \cdot L_1(L-L_1)/L^2 = Rs \cdot (L-2L_1) \cdot (L-L_1)/L^2$.

The interconnect resistance difference between the Y electrode 30y4 and the Y electrode 30y5 is $2Rs \cdot L_1(L-L_1)/L^2 - Rs \cdot L_1/L = Rs \cdot (L-2L_1) \cdot L_1/L^2$. Both are smaller than the interconnect resistance difference $Rs \cdot (L-2L_1)/L$ according to the example of FIG. 11A. Thus, it can be said that, according to the present embodiment, it is possible to decrease the difference between the reception intensity of the pen signal PS received via the Y electrode 30y3 or 30y4 and the reception intensity of the pen signal PS received via the Y electrode 30y5. Therefore, it can be said that the sensor controller 31 becomes capable of accurately deriving the position of the pen 2.

As described above, according to the sensor 30 of the present embodiment, one of the two Y electrodes 30y located across the boundary of switching of the connection position of the routing line RLy is divided into two sub-electrodes. Thus, the position of the pen 2 can be detected with high accuracy although the routing line RLy is connected to one end in the X direction for half of the Y electrodes 30y from one side in the Y direction and the routing line RLy is connected to the other end in the X direction for the remaining half of the Y electrodes 30y.

FIG. 12B is a partially enlarged view of a sensor 30 according to a modification of the present embodiment. FIG. 12A is the same diagram as FIG. 10A. The sensor 30 according to the present modification is different from the sensor 30 according to the present embodiment in that the mesh density of each of the first sub-electrode 30y4a and the second sub-electrode 30y4b forming the Y electrode 30y4 is set higher than that of the other Y electrodes 30y. This causes the interconnect resistance per unit length in the first sub-electrode 30y4a and the second sub-electrode 30y4b to become low compared with in the present embodiment. Thus, the interconnect resistance of each of the first sub-electrode 30y4a and the second sub-electrode 30y4b having a smaller width than the other Y electrodes 30y can be brought closer to the interconnect resistance of the other Y electrodes 30y.

Next, a position detection system 1 according to a third embodiment of the present disclosure will be described. The position detection system 1 according to the present embodiment is different from the position detection system 1 according to the second embodiment in the following points. Several Y electrodes RLy located around the boundary of switching of the connection position of the routing line RLy are connected to the routing line RLy at both one end and the other end in the X direction. Furthermore, the position detection system 1 according to the present embodiment has a switch for selectively connecting, to the sensor controller 31, only one of the routing line RLy connected to the one end of such a Y electrode RLy in the X direction and the routing line RLy connected to the other end. Moreover, the Y electrode RLy located at the boundary of switching of the connection position of the routing line RLy is not divided into two sub-electrodes. In addition, the position detection system 1 according to the present embodiment is different from the position detection system 1 according to the second embodiment also in the position derivation processing executed by the sensor controller 31. In the other points, the position detection system 1 according to the present embodiment is similar to the position detection system 1 according to the second embodiment. Thus, in the following, the description is continued with focus on the differences from the position detection system 1 according to the second embodiment.

FIG. 13 is a diagram illustrating the configuration of the position detection device 34 according to the present embodiment in detail. As illustrated in this diagram, in the present embodiment, n (n is a natural number equal to or larger than 3 and, in the present embodiment, n=8) Y electrodes 30y are classified into, sequentially from one side in the Y direction, m (m≥1 and, in the present embodiment, m=3) first sensor electrodes SE1, k (k≥1 and, in the present embodiment, k=2) second sensor electrodes SE2, and n−m−k (in the present embodiment, three) third sensor electrodes SE3. Furthermore, the sensor 30 includes m+k routing lines RLy1 that connect one end in the X direction in each of the m first sensor electrodes SE1 and the k second sensor electrodes SE2 to the sensor controller 31 and n−m routing lines RLy2 that connect the other end in the X direction in each of the k second sensor electrodes SE2 and the n−m−k third sensor electrodes SE3 to the sensor controller 31.

The position detection device 34 has a k-pole double-throw switch 40 having a control target circuit (pole) corresponding to each of the k second sensor electrodes SE2. This switch 40 is configured to be capable of connecting either one of the routing lines RLy1 and RLy2 to the sensor controller 31, regarding each control target circuit (that is, each second sensor electrode SE2), according to control by the sensor controller 31.

FIGS. 14A to 14D are diagrams for explaining a problem that occurs when position detection of the pen 2 is executed by use of the sensor 30 according to the background technique of the present embodiment. FIGS. 14A and 14C illustrate the configuration of the sensor 30 in the background technique of the present embodiment. As illustrated in these diagrams, the sensor 30 in the background technique of the present embodiment has a configuration in which the routing line RLy is connected to one end in the X direction for the Y electrodes 30y1 to 30y4 as half of the Y electrodes 30y from one side in the Y direction and the routing line RLy is connected to the other end in the X direction for the Y electrodes 30y5 to 30y8 as the remaining half.

FIG. 14B is a diagram illustrating the reception intensity (reception intensity acquired by the sensor controller 31) at each Y electrode 30y, regarding the pen signal PS from the pen 2 existing at a position indicated in FIG. 14A. The position of the pen tip of the pen 2 illustrated in FIG. 14A is a position that is close to the other end on the Y electrode 30y3 and is close to the Y electrode 30y2.

Furthermore, FIG. 14D is a diagram illustrating the reception intensity at each Y electrode 30y (reception intensity acquired by the sensor controller 31) regarding the pen signal PS from the pen 2 being at a position indicated in FIG. 14C. The position of the pen tip of the pen 2 illustrated in FIG. 14C is a position that is close to the other end on the Y electrode 30y5 and is close to the Y electrode 30y6.

As illustrated in FIGS. 14B and 14D, according to the background technique illustrated in FIGS. 14A to 14D, when the pen tip of the pen 2 is located close to the other end of any Y electrode 30y, the amount of attenuation of the pen signal PS received by the Y electrodes 30y1 to 30y4 is large compared with the amount of attenuation of the pen signal PS received by the Y electrodes 30y5 to 30y8. This is attributed to the difference in the end portion connected to the routing line RLy. Moreover, as the result thereof, when the reception intensity of the Y electrode 30y3 in FIG. 14B and the reception intensity of the Y electrode 30y5 in FIG. 14D, which are both at a peak, are compared, the latter is higher.

The problem occurs when the pen tip of the pen 2 is near the boundary of switching of the connection position of the routing line Rly, as in the example of FIG. 14C. In this case, the path length of the reception path of the pen signal PS in the Y electrode 30y greatly differs between the Y electrode 30y5 corresponding to the peak and the Y electrode 30y6 adjacent to the Y electrode 30y5 on one side and the Y electrode 30y4 adjacent to the Y electrode 30y5 on the other side. As a result, the amount of attenuation in the Y electrode 30y greatly differs between the pen signal PS received via the Y electrode 30y5 or 30y6 and the pen signal PS received via the Y electrode 30y4. Thus, the sensor controller 31 becomes incapable of correctly deriving the position of the pen 2 even when the above-described three-point method is used.

FIGS. 15A to 15D are diagrams for explaining a method for executing position detection of the pen 2 by use of the sensor 30 according to the present embodiment. The position derivation processing executed by the sensor controller 31 according to the present embodiment will be described below with reference to FIGS. 15A to 15D.

The sensor controller 31 according to the present embodiment executes processing of receiving the pen signal PS by use of the routing lines RLy1 and processing of receiving the pen signal PS by use of the routing lines RLy2 in a time-sharing manner by switching the routing lines connected to the sensor controller 31 by control of the switch 40. In the former processing, the reception intensity is acquired regarding the Y electrodes 30y1 to 30y5, and the reception intensity is not acquired regarding the Y electrodes 30y6 to 30y8. Furthermore, in the latter processing, the reception intensity is acquired regarding the Y electrodes 30y4 to 30y8, and the reception intensity is not acquired regarding the Y electrodes 30y1 to 30y3.

FIG. 15B is a diagram illustrating the reception intensity at each Y electrode 30y (reception intensity acquired by the sensor controller 31) regarding the pen signal PS from the pen 2 being at a position indicated in FIG. 15A (same position as the position indicated in FIG. 14A) concerning each of a case in which the pen signal PS is received by use of the routing lines RLy1 and a case in which the pen signal PS is received by use of the routing lines RLy2.

Moreover, FIG. 15D is a diagram illustrating the reception intensity at each Y electrode 30y (reception intensity acquired by the sensor controller 31) regarding the pen signal PS from the pen 2 being at a position indicated in FIG. 15C (same position as the position indicated in FIG. 14C) concerning each of a case in which the pen signal PS is received by use of the routing lines RLy1 and a case in which the pen signal PS is received by use of the routing lines RLy2.

As is understood from the comparison between FIGS. 15D and 14D, in the present embodiment, even in a case in which a peak is detected at the Y electrode $30y5$, the pen signal PS can be received at each of the Y electrodes $30y4$ and $30y6$ adjacent to the Y electrode $30y5$ on both sides with the same amount of attenuation as the Y electrode $30y5$, as indicated by the reception intensity of the pen signal PS received by use of the routing lines RLy2. Therefore, the sensor controller 31 can correctly derive the position of the pen 2, compared with the background technique.

Here, in order to correctly derive the position of the pen 2, the sensor controller 31 needs to select either one of the series of reception intensity obtained through reception by use of the routing lines RLy1 and the series of reception intensity obtained through reception by use of the routing lines RLy2 and execute the position derivation by use of the selected one. Processing executed by the sensor controller 31 for this purpose will be described in detail below with reference to processing flowcharts.

Figure 16:
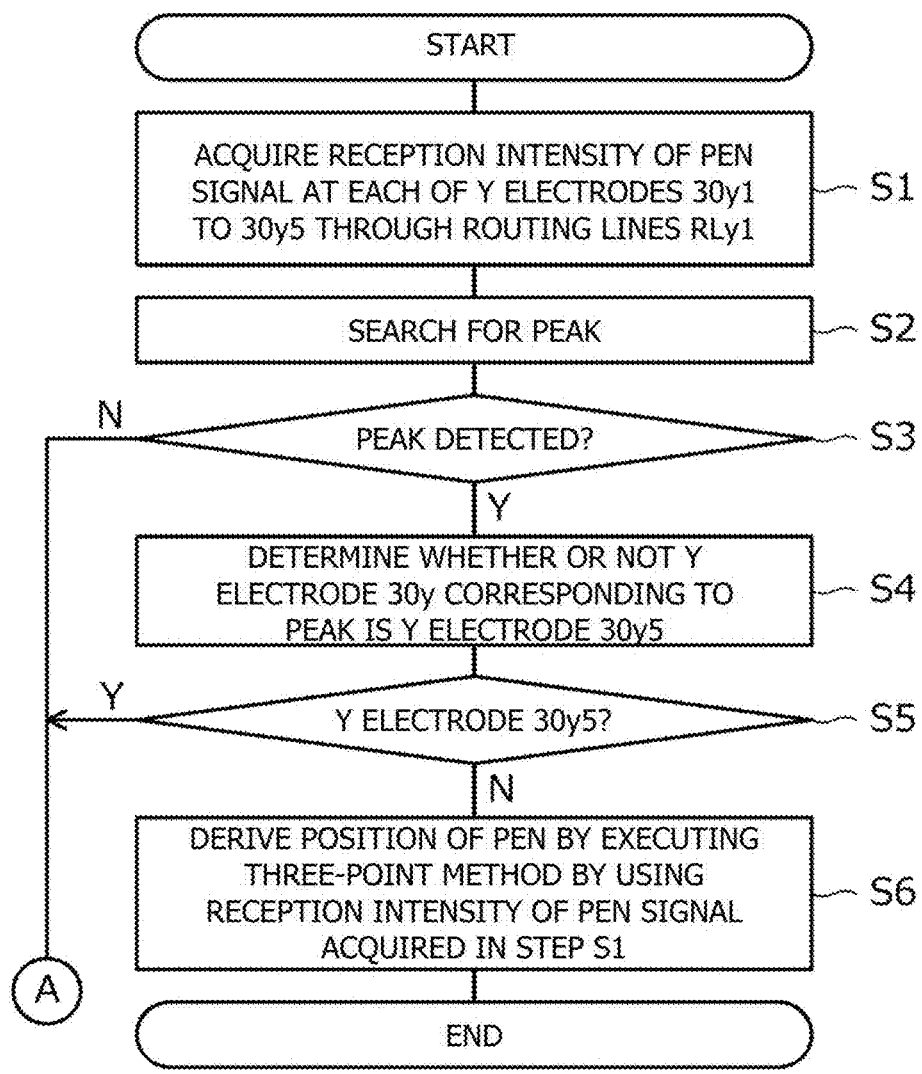
FIG. 16 is a processing flowchart illustrating processing executed by a sensor controller according to the third embodiment of the present disclosure in order to derive the position of the pen.
Figure 17:
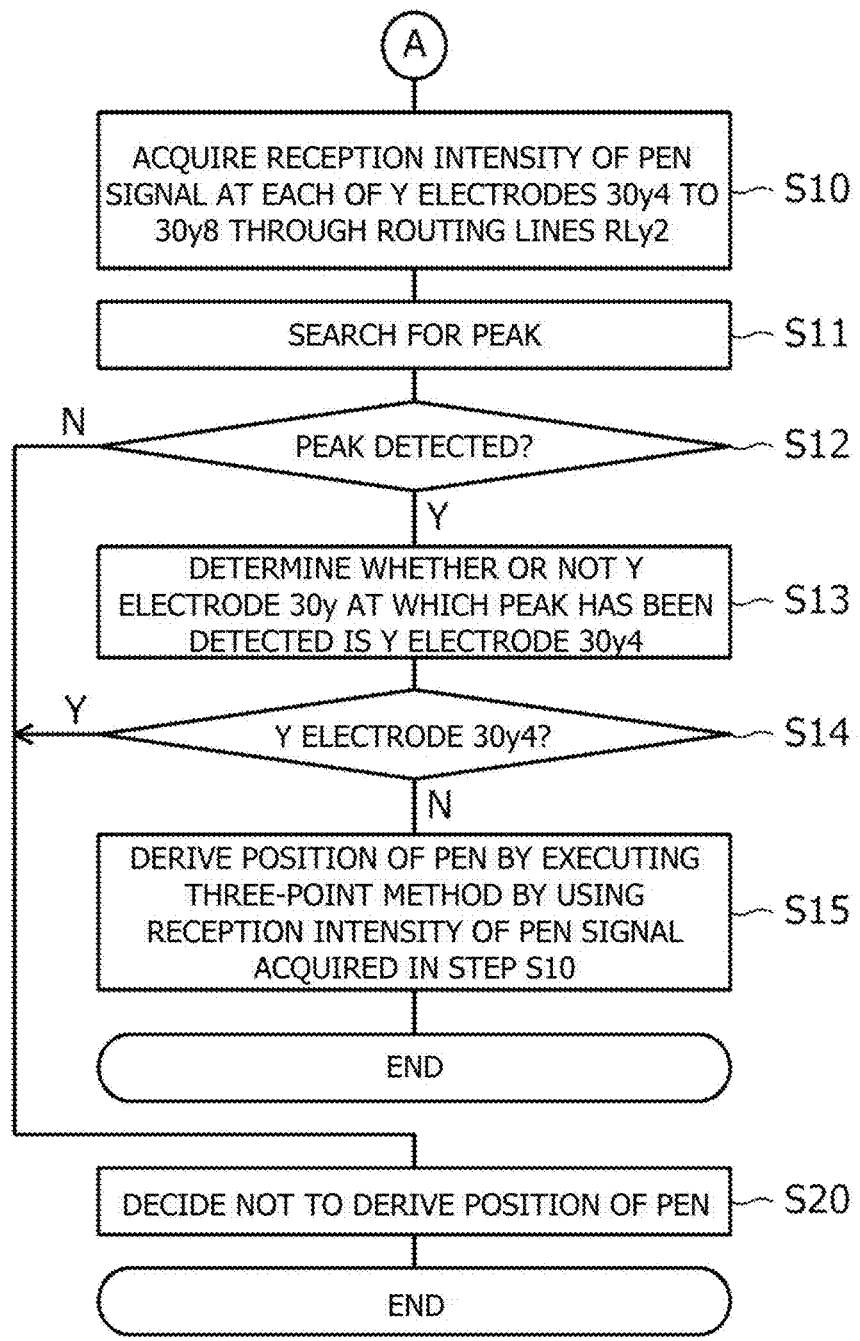
FIG. 17 is a processing flowchart illustrating the processing executed by the sensor controller according to the third embodiment of the present disclosure in order to derive the position of the pen.

FIGS. 16 and 17 are the processing flowcharts illustrating the processing executed by the sensor controller 31 according to the present embodiment in order to derive the position of the pen 2. Note that this processing can be applied to both the above-described global scan and local scan. Here, description will be given by taking as an example a case in which the processing is applied to the global scan.

Referring first to FIG. 16, the sensor controller 31 according to the present embodiment first acquires the reception intensity of the pen signal PS at each of the Y electrodes $30y1$ to $30y5$ through the routing lines RLy1 by switching the switch 40 to the side of the routing lines RLy1 (step S1). Then, the sensor controller 31 searches for the peak of the acquired reception intensity (step S2), and determines whether or not the peak is detected (step S3).

When determining that the peak is not detected in the step S3, the sensor controller 31 advances the processing to a step S10 in FIG. 17. Conversely, when determining that the peak is detected in the step S3, the sensor controller 31 determines whether or not the Y electrode $30y$ corresponding to the peak is the Y electrode $30y5$ (that is, the second sensor electrode SE2 adjacent to the third sensor electrode SE3) (steps S4 and S5).

When determining that the Y electrode $30y$ corresponding to the peak is the Y electrode $30y5$ in the steps S4 and S5, the sensor controller 31 advances the processing to the step S10 in FIG. 17. Conversely, when determining that the Y electrode $30y$ corresponding to the peak is not the Y electrode $30y5$ in the steps S4 and S5, the sensor controller 31 derives the position of the pen by executing the above-described three-point method by use of the reception intensity of the pen signal acquired in the step S1 (step S6), and ends the processing. In this case, the sensor controller 31 has selected the series of reception intensity obtained through reception by use of the routing lines RLy1.

Referring next to FIG. 17, the sensor controller 31 that has advanced the processing to the step S10 acquires the reception intensity of the pen signal PS at each of the Y electrodes $30y4$ to $30y8$ through the routing lines RLy2 by switching the switch 40 to the side of the routing lines RLy2 (step S10). Then, the sensor controller 31 searches for the peak of the acquired reception intensity (step S11), and determines whether or not the peak is detected (step S12).

When determining that the peak is not detected in the step S12, the sensor controller 31 decides not to derive the position of the pen 2 (step S20), and ends the processing. Conversely, when determining that the peak is detected in the step S12, the sensor controller 31 determines whether or not the Y electrode $30y$ corresponding to the peak is the Y electrode $30y4$ (that is, the second sensor electrode SE2 adjacent to the first sensor electrode SE1) (steps S13 and S14).

When determining that the Y electrode $30y$ corresponding to the peak is the Y electrode $30y4$ in the steps S13 and S14, the sensor controller 31 decides not to derive the position of the pen 2 (step S20), and ends the processing. Conversely, when determining that the Y electrode $30y$ corresponding to the peak is not the Y electrode $30y4$ in the steps S13 and S14, the sensor controller 31 derives the position of the pen by executing the above-described three-point method by use of the reception intensity of the pen signal acquired in the step S10 (step S15), and ends the processing. In this case, the sensor controller 31 has selected the series of reception intensity obtained through reception by use of the routing lines RLy2.

Description has been given above regarding the processing executed by the sensor controller 31 in order to select either one of the series of reception intensity obtained through reception by use of the routing lines RLy1 and the series of reception intensity obtained through reception by use of the routing lines RLy2. Executing this processing allows the sensor controller 31 to derive the position of the pen 2 in a state in which the pen signal PS can be received at each of the two Y electrodes $30y$ adjacent to the Y electrode $30y$ corresponding to the peak on both sides with the same amount of attenuation. Therefore, it becomes possible to correctly derive the position of the pen 2.

As described above, according to the position detection device 34 according to the present embodiment, the sensor 30 is configured to have the Y electrode connected to the routing lines at both ends at the boundary of switching of the connection position of the routing line, and the sensor controller 31 is configured to select the routing lines on either side and derive the position of the pen 2. Thus, as in the second embodiment, the position of the pen 2 can be detected with high accuracy although the routing line RLy is connected to one end in the X direction for half of the Y electrodes $30y$ from one side in the Y direction and the routing line RLy is connected to the other end in the X direction for the remaining half of the Y electrodes $30y$.

In the processing described with reference to FIGS. 16 and 17, the series of reception intensity is acquired by use of the routing lines RLy2 only when the position derivation by the series of reception intensity obtained through reception by use of the routing lines RLy1 is not executed. However, the sensor controller 31 may acquire the series of reception intensity by use of the routing lines RLy2, irrespective of whether or not to execute the position derivation by the series of reception intensity obtained through reception by use of the routing lines RLy1. This allows the sensor controller 31 to derive the position of the pen 2 by use of more appropriate one of the reception result of the pen signal by the routing lines RLy1 and the reception result of the pen signal by the routing lines RLy2 after checking both reception results.

Although the preferred embodiments of the present disclosure have been described above, it is obvious that the present disclosure is not limited to such embodiments at all and can be carried out in various modes without departing from the gist thereof.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A sensor comprising:
   a plurality of sensor electrodes disposed from a first end to a second end in a first direction in a touch surface;
   a plurality of terminals, wherein each of the terminals is disposed for a corresponding one of a plurality of sets of sensor electrodes among the plurality of sensor electrodes and is connected to a sensor controller; and
   a plurality of routing lines, wherein each of the routing lines connects one of the plurality of sensor electrodes to a corresponding to one of the terminals,
   an interconnect resistance per unit length of each of the sensor electrodes becomes lower continuously or in a stepwise manner, according to an interconnect distance from a portion connecting with one of the routing lines corresponding to one of the sensor electrodes, and
   wherein a difference in interconnect resistances between any two sensor electrodes among the plurality of sensor electrodes is smaller than a case in which an interconnect resistance per unit length in each of the routing lines is constant.

2. The sensor according to claim 1, wherein
   the interconnect resistance per unit length of each of the routing lines becomes lower continuously or in the stepwise manner, according to the interconnect distance from the portion connecting with the one of the terminals corresponding to the one of the routing lines.

3. The sensor according to claim 2, wherein
   a width of each of the routing lines enlarges continuously or in the stepwise manner according to the interconnect distance from the portion connecting with the one of the terminals corresponding to the one of the routing lines.

4. The sensor according to claim 2, wherein
   a thickness of each of the routing lines increases continuously or in the stepwise manner according to the interconnect distance from the portion connecting with the one of the terminals corresponding to the one of the routing lines.

5. The sensor according to claim 1, wherein
   a width of each of the sensor electrodes enlarges continuously or in the stepwise manner according to the interconnect distance from the portion connecting with the one of the routing lines corresponding to the one of the sensor electrodes.

6. The sensor according to claim 1, wherein
   a thickness of each of the sensor electrodes increases continuously or in the stepwise manner according to the interconnect distance from the portion connecting with the one of the routing lines corresponding to the one of the sensor electrodes.

7. The sensor according to claim 1, wherein
   each of the sensor electrodes is a mesh-shaped conductor, and
   a number of intersections per unit length in each mesh-shaped conductor increases according to the interconnect distance from the portion connecting with the one of the routing lines corresponding to the one of the sensor electrodes.

8. The sensor according to claim 1, wherein
   each of the sensor electrodes is a mesh-shaped conductor, and
   an interconnect density of each mesh-shaped conductor increases according to the interconnect distance from the portion connecting with the one of the routing lines corresponding to the one of the sensor electrodes.

9. A sensor comprising:
   a plurality of sensor electrodes, wherein the sensor electrodes extend in a first direction and are arranged in a second direction intersecting the first direction, and wherein a number of the sensor electrodes is n (n≥3); and
   a plurality of routing lines that respectively connect the plurality of sensor electrodes to a sensor controller, wherein:
   m (1≤m≤n−2) of the sensor electrodes from a first side in the second direction among the plurality of sensor electrodes are respectively connected to m of the routing lines corresponding to m of the sensor electrodes at a first end in the first direction,
   n−m−1 of the sensor electrodes from a second side in the second direction among the plurality of sensor electrodes are respectively connected to n−m−1 of the routing lines corresponding to n−m−1 of the sensor electrodes at a second end in the first direction,
   an m+1-th sensor electrode from the first side in the second direction among the plurality of sensor electrodes includes a first sub-electrode and a second sub-electrode in each of which a length in the first direction is same as a length of the sensor electrodes other than the m+1-th sensor electrode in the first direction and a length in the second direction is shorter than a length of the sensor electrodes other than the m+1-th sensor electrode in the second direction,
   the first sub-electrode is connected to one of the routing lines corresponding to the first sub-electrode at the first end in the first direction, and
   the second sub-electrode is connected to one of the routing lines corresponding to the second sub-electrode at the second end in the first direction.

10. The sensor according to claim 9, wherein
    the first sub-electrode is extended on the first side in the second direction relative to the second sub-electrode.

11. The sensor according to claim 9, wherein
    each of the sensor electrodes is a mesh-shaped conductor, and
    an interconnect density of each mesh-shaped conductor forming the first sub-electrode and the second sub-electrode is higher than an interconnect density of each mesh-shaped conductors forming the sensor electrodes other than the sensor electrodes forming the first sub-electrode and the second sub-electrode.

12. A sensor comprising:
    a plurality of sensor electrodes, wherein the sensor electrodes extend in a first direction and are arranged in a second direction intersecting the first direction, and wherein a number of the sensor electrodes is n (n≥3); and a plurality of routing lines that respectively connect the plurality of sensor electrodes to a sensor controller, wherein the sensor electrodes include m (m≥1) first sensor electrodes, k (k≥1) second sensor electrodes, and n−m−k third sensor electrodes sequentially from a first side in the second direction, and wherein the plurality of routing lines include m+k first routing lines that connect a first end in the first direction in each of the first sensor electrodes and the second sensor electrodes to the sensor controller, and n−m second routing lines that connect a second end in the first direction in each of the second sensor electrodes and the third sensor electrodes to the sensor controller.

* * * * *